US011943156B2

(12) United States Patent
Nam et al.

(10) Patent No.: US 11,943,156 B2
(45) Date of Patent: Mar. 26, 2024

(54) PROCESSING POSITIONING REFERENCE SIGNALS ACCORDING TO PRIORITY

(71) Applicant: QUALCOMM Incorporated, San Diego, CA (US)

(72) Inventors: Wooseok Nam, San Diego, CA (US); Tao Luo, San Diego, CA (US); Sony Akkarakaran, Poway, CA (US); Yucheng Dai, San Diego, CA (US); Jingchao Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 17/484,986

(22) Filed: Sep. 24, 2021

(65) Prior Publication Data

US 2023/0094751 A1    Mar. 30, 2023

(51) Int. Cl.
H04L 5/00      (2006.01)
H04W 4/029     (2018.01)
H04W 72/20     (2023.01)
H04W 72/56     (2023.01)

(52) U.S. Cl.
CPC ........... H04L 5/0048 (2013.01); H04W 4/029 (2018.02); H04W 72/20 (2023.01); H04W 72/56 (2023.01)

(58) Field of Classification Search
CPC ... H04W 72/56; H04W 72/046; H04W 64/00; H04W 72/563; H04L 5/0051
USPC ........... 455/456, 456.1, 450, 452.2; 370/252, 370/329, 330
See application file for complete search history.

(56) References Cited

U.S. PATENT DOCUMENTS

| 11,569,900 | B2* | 1/2023 | Islam | H04B 7/0695 |
| 2007/0281662 | A1 | 12/2007 | Kim et al. | |
| 2009/0002237 | A1 | 1/2009 | Nonoyama | |
| 2020/0367278 | A1* | 11/2020 | Hosseini | H04L 5/0094 |
| 2022/0225290 | A1* | 7/2022 | Ganesan | H04W 72/56 |
| 2022/0311503 | A1* | 9/2022 | Islam | H04W 72/046 |
| 2023/0052126 | A1 | 2/2023 | Nam et al. | |

(Continued)

FOREIGN PATENT DOCUMENTS

| CN | 100397801 C | * | 6/2008 | ........... H04B 1/7117 |
| CN | 112039645 | * | 12/2020 | |

(Continued)

OTHER PUBLICATIONS

R. Favraud, C.-Y. Chang and N. Nikaein, "Autonomous Self-Backhauled LTE Mesh Network With QoS Guarantee," in IEEE Access, vol. 6, pp. 4083-4117, 2018, doi: 10.1109/ACCESS.2018.2794333. (Year: 2018).*

(Continued)

Primary Examiner — William D Cumming
(74) Attorney, Agent, or Firm — Holland & Hart LLP

(57) ABSTRACT

One or more anchor nodes, which may be sidelink devices, may transmit positioning reference signals (PRSs) to a wireless device, such as a user equipment (UE). The UE may select one or more PRSs to process based on respective priorities of the PRSs. At least one anchor node may transmit a priority indication including the respective priorities, or the one or more anchor nodes may transmit the PRSs according to a scrambling sequence or pattern to implicitly indicate the respective priorities. The UE may decode one or more PRSs based on the respective priorities.

36 Claims, 17 Drawing Sheets

(56) References Cited

U.S. PATENT DOCUMENTS

| | | | | |
|---|---|---|---|---|
| 2023/0092211 A1* | 3/2023 | Nam | .................... | G01S 5/0236 |
| | | | | 455/456.1 |
| 2023/0094751 A1* | 3/2023 | Nam | ....................... | G01S 1/042 |
| | | | | 370/329 |
| 2023/0156656 A1* | 5/2023 | Si | ......................... | H04W 64/00 |
| | | | | 455/450 |
| 2023/0164612 A1* | 5/2023 | Si | ......................... | H04L 5/0051 |
| | | | | 370/252 |
| 2023/0254809 A1* | 8/2023 | Wang | .................... | H04L 5/0053 |
| | | | | 455/456.2 |
| 2023/0254811 A1* | 8/2023 | Wang | .................... | H04L 5/0007 |
| | | | | 370/330 |
| 2023/0261837 A1* | 8/2023 | Keating | ................. | H04L 5/005 |
| | | | | 370/329 |
| 2023/0269059 A1* | 8/2023 | Kuo | ..................... | H04L 5/0096 |
| | | | | 370/329 |
| 2023/0283424 A1* | 9/2023 | Rao | ....................... | H04L 5/0053 |
| | | | | 370/329 |
| 2023/0309066 A1* | 9/2023 | Ganesan | ............ | H04W 72/563 |
| | | | | 370/329 |
| 2023/0345408 A1* | 10/2023 | Thomas | ............... | H04W 64/00 |

FOREIGN PATENT DOCUMENTS

| | | | | |
|---|---|---|---|---|
| KR | 20070115550 A | | 12/2007 | |
| KR | 202100116489 | * | 9/2021 | |
| WO | WO-2021240477 A1 | * | 12/2021 | ........... G01S 5/0036 |
| WO | WO-2021240479 A1 | * | 12/2021 | ........... H04L 5/0051 |
| WO | WO-2022078445 A1 | * | 4/2022 | ........... G01S 5/0036 |

OTHER PUBLICATIONS

English translation of CN11203645 Apr. 2023 (Year: 2023).*
International Search Report and Written Opinion—PCT/US2022/042187—ISA/EPO—dated Dec. 12, 2022.

* cited by examiner

PROCESSING POSITIONING REFERENCE SIGNALS ACCORDING TO PRIORITY

INTRODUCTION

The following relates to wireless communications, including processing positioning reference signals (PRSs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include receiving, from one or more anchor nodes, a set of PRSs over a set of resources, receiving one or more indications that indicate a respective priority for each of one or more PRSs of the set of PRSs, and decoding at least one PRS of the set of PRSs to obtain positioning information associated with the UE, the at least one PRS based on the one or more indications.

An apparatus for wireless communication at a UE is described. The apparatus may include a processor and memory coupled to the processor, the processor and memory configured to receive, from one or more anchor nodes, a set of PRSs over a set of resources, receive one or more indications that indicate a respective priority for each of one or more PRSs of the set of PRSs, and decode at least one PRS of the set of PRSs to obtain positioning information associated with the UE, the at least one PRS based on the one or more indications.

Another apparatus for wireless communication at a UE is described. The apparatus may include means for receiving, from one or more anchor nodes, a set of PRSs over a set of resources, means for receiving one or more indications that indicate a respective priority for each of one or more PRSs of the set of PRSs, and means for decoding at least one PRS of the set of PRSs to obtain positioning information associated with the UE, the at least one PRS based on the one or more indications.

A non-transitory computer-readable medium storing code for wireless communication at a UE is described. The code may include instructions executable by a processor to receive, from one or more anchor nodes, a set of PRSs over a set of resources, receive one or more indications that indicate a respective priority for each of one or more PRSs of the set of PRSs, and decode at least one PRS of the set of PRSs to obtain positioning information associated with the UE, the at least one PRS based on the one or more indications.

Some examples of the method, apparatuses, and non-transitory computer-readable medium described herein may further include operations, features, means, or instructions for receiving the set of PRSs, the set of PRSs scrambled according to a respective scrambling sequence for each of the one or more PRSs, where the respective scrambling sequence indicates the respective priority.

Some examples of the method, apparatuses, and non-transitory computer-readable medium described herein may further include operations, features, means, or instructions for receiving the set of PRSs according to a respective resource mapping pattern for each of the one or more PRSs, where the respective resource mapping pattern indicates the respective priority.

Some examples of the method, apparatuses, and non-transitory computer-readable medium described herein may further include operations, features, means, or instructions for receiving one or more control channels associated with the one or more PRSs, where the one or more control channels indicates the respective priority for each of the one or more PRSs.

In some examples of the method, apparatuses, and non-transitory computer-readable medium described herein, a control channel of the one or more control channels includes sidelink control information (SCI) having a priority field that indicates a priority of a PRS associated with the control channel.

Some examples of the method, apparatuses, and non-transitory computer-readable medium described herein may further include operations, features, means, or instructions for receiving at least one control channel including a list associated with the one or more PRSs, the list ordered according to the respective priority for each of the one or more PRSs.

Some examples of the method, apparatuses, and non-transitory computer-readable medium described herein may further include operations, features, means, or instructions for receiving, from the one or more anchor nodes, one or more broadcast signals indicating the respective priority for each of the one or more PRSs, where a payload or a sequence of the one or more broadcast signals indicates the respective priority.

Some examples of the method, apparatuses, and non-transitory computer-readable medium described herein may further include operations, features, means, or instructions for receiving a configuration message including a list of priorities, where the respective priority for each of the one or more PRSs may be based on the list of priorities.

Some examples of the method, apparatuses, and non-transitory computer-readable medium described herein may further include operations, features, means, or instructions for receiving one or more priority parameters that indicate the respective priority for each of the one or more PRSs, the respective priorities based on the set of resources, a resource of the set of resources, an anchor node of the one or more anchor nodes, a reliability of a PRS of the one or more PRSs, or a combination thereof.

Some examples of the method, apparatuses, and non-transitory computer-readable medium described herein may further include operations, features, means, or instructions for selecting the at least one PRS from the one or more PRSs based on a priority rule for obtaining the positioning information associated with the UE and the one or more indications.

Some examples of the method, apparatuses, and non-transitory computer-readable medium described herein may further include operations, features, means, or instructions for selecting the at least one PRS from the one or more PRSs based on a capability of the UE.

Some examples of the method, apparatuses, and non-transitory computer-readable medium described herein may further include operations, features, means, or instructions for selecting the at least one PRS based on a priority of the at least one PRS being greater than a priority of a second PRS of the one or more PRSs, where one or more resources of the at least one PRS overlap with one or more resources of the second PRS.

Some examples of the method, apparatuses, and non-transitory computer-readable medium described herein may further include operations, features, means, or instructions for transmitting a report including a priority of the at least one PRS, where the priority may be based on one or more parameters associated with the UE.

Some examples of the method, apparatuses, and non-transitory computer-readable medium described herein may further include operations, features, means, or instructions for transmitting a request for a priority of the at least one PRS.

Some examples of the method, apparatuses, and non-transitory computer-readable medium described herein may further include operations, features, means, or instructions for determining to override the respective priority for the at least one PRS based on one or more parameters of the UE and selecting the at least one PRS based on determining to override the respective priority for the at least one PRS.

In some examples of the method, apparatuses, and non-transitory computer-readable medium described herein, the respective priority for each of the one or more positioning reference signals may be based on a type of an anchor node of the one or more anchor nodes, positioning reliability information associated with the anchor node, transmission parameters associated with the anchor node, a signal quality parameter associated with the anchor node, a mobility parameter of the anchor node, a type of a PRS, a band type for the PRS, or a combination thereof.

A method for wireless communication at an anchor node is described. The method may include transmitting, to a UE, a set of PRSs over a set of resources and transmitting, to the UE, one or more indications that indicate a respective priority for each of one or more PRSs of the set of PRSs.

An apparatus for wireless communication at an anchor node is described. The apparatus may include a processor and memory coupled to the processor, the processor and memory configured to transmit, to a UE, a set of PRSs over a set of resources and transmit, to the UE, one or more indications that indicate a respective priority for each of one or more PRSs of the set of PRSs.

Another apparatus for wireless communication at an anchor node is described. The apparatus may include means for transmitting, to a UE, a set of PRSs over a set of resources and means for transmitting, to the UE, one or more indications that indicate a respective priority for each of one or more PRSs of the set of PRSs.

A non-transitory computer-readable medium storing code for wireless communication at an anchor node is described. The code may include instructions executable by a processor to transmit, to a UE, a set of PRSs over a set of resources and transmit, to the UE, one or more indications that indicate a respective priority for each of one or more PRSs of the set of PRSs.

Some examples of the method, apparatuses, and non-transitory computer-readable medium described herein may further include operations, features, means, or instructions for transmitting the set of PRSs, the set of PRSs scrambled according to a respective scrambling sequence for each of the one or more PRSs, where the respective scrambling sequence indicates the respective priority.

Some examples of the method, apparatuses, and non-transitory computer-readable medium described herein may further include operations, features, means, or instructions for transmitting the set of PRSs, the set of PRSs transmitted according to a resource mapping pattern, where the respective resource mapping patterns for the one or more PRSs indicate the respective priority for each of the one or more PRSs.

Some examples of the method, apparatuses, and non-transitory computer-readable medium described herein may further include operations, features, means, or instructions for transmitting one or more control channels associated with the one or more PRSs, where the one or more control channels indicate the respective priority for each of the one or more PRSs.

In some examples of the method, apparatuses, and non-transitory computer-readable medium described herein, a control channel of the one or more control channels includes SCI having a priority field that indicates a priority of a PRS associated with the control channel.

Some examples of the method, apparatuses, and non-transitory computer-readable medium described herein may further include operations, features, means, or instructions for transmitting at least one control channel including a list associated with the one or more PRSs, the list ordered according to the respective priorities.

Some examples of the method, apparatuses, and non-transitory computer-readable medium described herein may further include operations, features, means, or instructions for transmitting, to the UE, one or more broadcast signals indicating the respective priority for each of the one or more PRSs, where a payload or a sequence of the one or more broadcast signals indicates the respective priorities.

Some examples of the method, apparatuses, and non-transitory computer-readable medium described herein may further include operations, features, means, or instructions for transmitting a configuration message including a list of priorities, where the respective priority for each of the one or more PRSs may be based on the list of priorities.

Some examples of the method, apparatuses, and non-transitory computer-readable medium described herein may further include operations, features, means, or instructions for transmitting one or more priority parameters that indicate the respective priority for each of the one or more PRSs, the respective priorities based on the set of resources, a resource of the set of resources, the anchor node, a reliability of a PRS of the one or more PRSs, or a combination thereof.

Some examples of the method, apparatuses, and non-transitory computer-readable medium described herein may further include operations, features, means, or instructions for receiving a report including a priority of at least one PRS of the set of PRSs, where the priority of the at least one PRS may be based on one or more parameters associated with the anchor node.

Some examples of the method, apparatuses, and non-transitory computer-readable medium described herein may further include operations, features, means, or instructions for receiving a request for a priority of at least one PRS of the set of PRSs.

Some examples of the method, apparatuses, and non-transitory computer-readable medium described herein may further include operations, features, means, or instructions for detecting a change in position at the anchor node.

In some examples of the method, apparatuses, and non-transitory computer-readable medium described herein, the respective priority for each of the one or more PRSs may be based on a type of the anchor node, positioning reliability information associated with the anchor node, transmission parameters associated with the anchor node, a signal quality parameter associated with the anchor node, a mobility parameter of the anchor node, a type of a PRS, a band type for the PRS, or a combination thereof.

In some examples of the method, apparatuses, and non-transitory computer-readable medium described herein, the anchor node may be a sidelink device.

DETAILED DESCRIPTION

Figure 1:
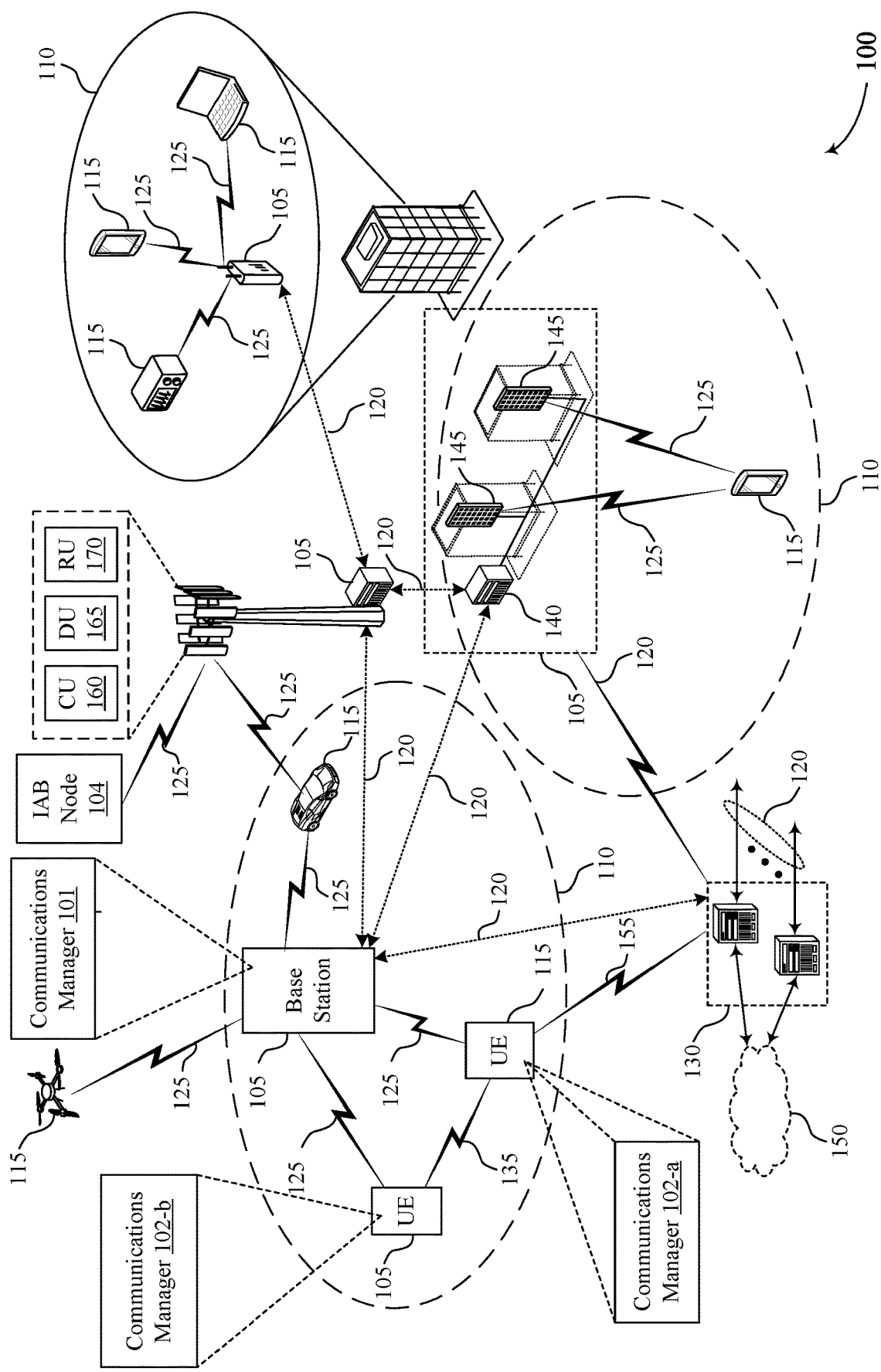
FIGS. 1 through 3 illustrate examples of wireless communications systems that support processing PRSs according to priority in accordance with one or more aspects of the present disclosure.

In some wireless communications systems, one or more UEs may communicate with each other, such as an anchor node (e.g., an anchor UE, which may communicate directly with a base station) communicating with one or more other UEs, which may be referred to as sidelink communication. To perform sidelink positioning, a UE may receive PRSs from one or more anchor nodes, which may indicate to the UE a position of another wireless device relative to the UE. In some cases, each anchor node may transmit one or more PRSs. The UE may determine the position of the anchor nodes by processing the PRSs. Further, the positions of the anchor nodes may be known values (e.g., known to the anchor node and a base station), and the UE may determine a position of the UE relative to the anchor nodes. In some cases, resources of multiple PRSs may collide (e.g., at least partially overlap in time or frequency). That is, because anchor nodes select resources (e.g., time-frequency resources) for PRSs from a shared pool, an anchor node may select the same resources as another anchor node for transmitting PRSs. When multiple anchor nodes select the same resources for PRS transmission, the UE may receive multiple PRSs, but may have the capability to process a portion (e.g., a subset) of the multiple PRSs and the UE may not know which of the multiple PRSs to select for processing in order to obtain accurate positioning information.

In some examples, a receiving UE may process one or more PRSs based on a respective priority of the PRSs. For example, the UE may receive PRSs from anchor nodes over a set of resources. The UE may use PRSs to determine positioning information for the UE relative to the one or more anchor nodes or positioning information of one or more neighboring UEs relative to the UE or the one or more anchor nodes, one or more surrounding wireless devices (e.g., UEs, base stations, etc.), or the like. In some cases, the UE may detect a priority of the PRSs based on receiving the PRSs (e.g., based on a scrambling sequence, a resource mapping pattern, an order of the PRSs in a list, or the like). The resource mapping pattern may include a comb-structure type, a comb-structure offset, or the like of the PRSs, where a comb-structure refers to a frequency pattern in which a PRS uses every Nth subcarrier. The comb value (e.g., N) may be configured, which may be referred to as a comb-structure type. The offset of a comb may refer to a number of frequency resources prior to the pattern-structure beginning. In some other cases, the UE may receive an explicit indication of the priority of the PRSs, such as a dynamic indication in a control channel, radio resource control (RRC) signaling, or a medium access control-control element (MAC-CE). The UE may decode one or more PRSs of the received PRSs (e.g., a subset of PRSs) based on applying the respective priority, such as according to a rule. For example, the UE may select the one or more PRSs based on a rule related to parameters of the anchor node (e.g., positioning reliability, transmission parameters, signal quality, mobility, and the like), a capability of the UE, or the like.

UEs supporting PRS priority in sidelink communications systems may utilize the techniques described herein to experience power savings and extended battery life while ensuring reliable and efficient communications in the group of UEs. For example, the UE may receive PRSs of different priorities from one or more wireless devices and may process a portion of the received PRSs (e.g., due to UE capability) according to respective priorities (e.g., may process PRSs with higher priority), which may reduce processing and signaling overhead, saving power at the UE and obtaining accurate positioning information. Particular aspects of the subject matter described in this disclosure may be implemented to support high reliability through transmission of priority indications for PRSs, and processing PRSs according to priorities, among other examples. The described techniques may thus include features for reducing power consumption, spectral efficiency, and provide higher data rates.

Aspects of the disclosure are initially described in the context of wireless communications systems. Aspects of the disclosure are further described in the context of a resource diagram and a process flow. Aspects of the disclosure are further illustrated by and described with reference to apparatus diagrams, system diagrams, and flowcharts that relate to processing PRSs according to priority.

FIG. 1 illustrates an example of a wireless communications system 100 that supports processing PRSs according to priority in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, such as in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting.

MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to perform one or more of the prioritization of PRSs, decoding of PRSs, or corresponding signaling described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to perform one or more of the signaling and prioritization techniques for PRSs described herein.

The wireless communications system 100 may be configured to support priority based PRS processing. For example, base stations 105 may include a communications manager 101 and UEs 115 may include a communications manager 102 that may support operating in accordance with a priority for PRS processing. For instance, a base station 105 may include a communications manager 101, a first UE 115 may include a communications manager 102-a, and a second UE 115 may include a communications manager 102-b. The communications manager 101 may be examples of aspects of a communications manager as described in FIGS. 9 through 12. The communications manager 102-a and the communications manager 102-b may be examples of aspects of a communications manager as described in FIGS. 5 through 8.

By way of example, a first UE 115 (e.g., using the communications manager 102-a) may communicate with a base station 105 (e.g., using the communications manager 101) and with a second UE 115 (e.g., using the communications manager 102-b). In some examples, a UE 115, such as the first UE 115, may decode one or more PRSs based on a priority of received PRSs. In some cases, the UE 115 may receive the PRSs from one or more anchor nodes, such as an anchor UE 115 (e.g., the second UE 115) or an anchor base station 105. In some cases, the UE 115 may determine a priority of the PRSs based on respective scrambling sequences of the PRSs, respective resource mapping patterns of the PRSs, or based on a direct indication of the priorities (e.g., in one or more control channels). The UE 115 may select PRSs to decode according to priority, such as selecting higher priority PRSs to decode.

Figure 2:
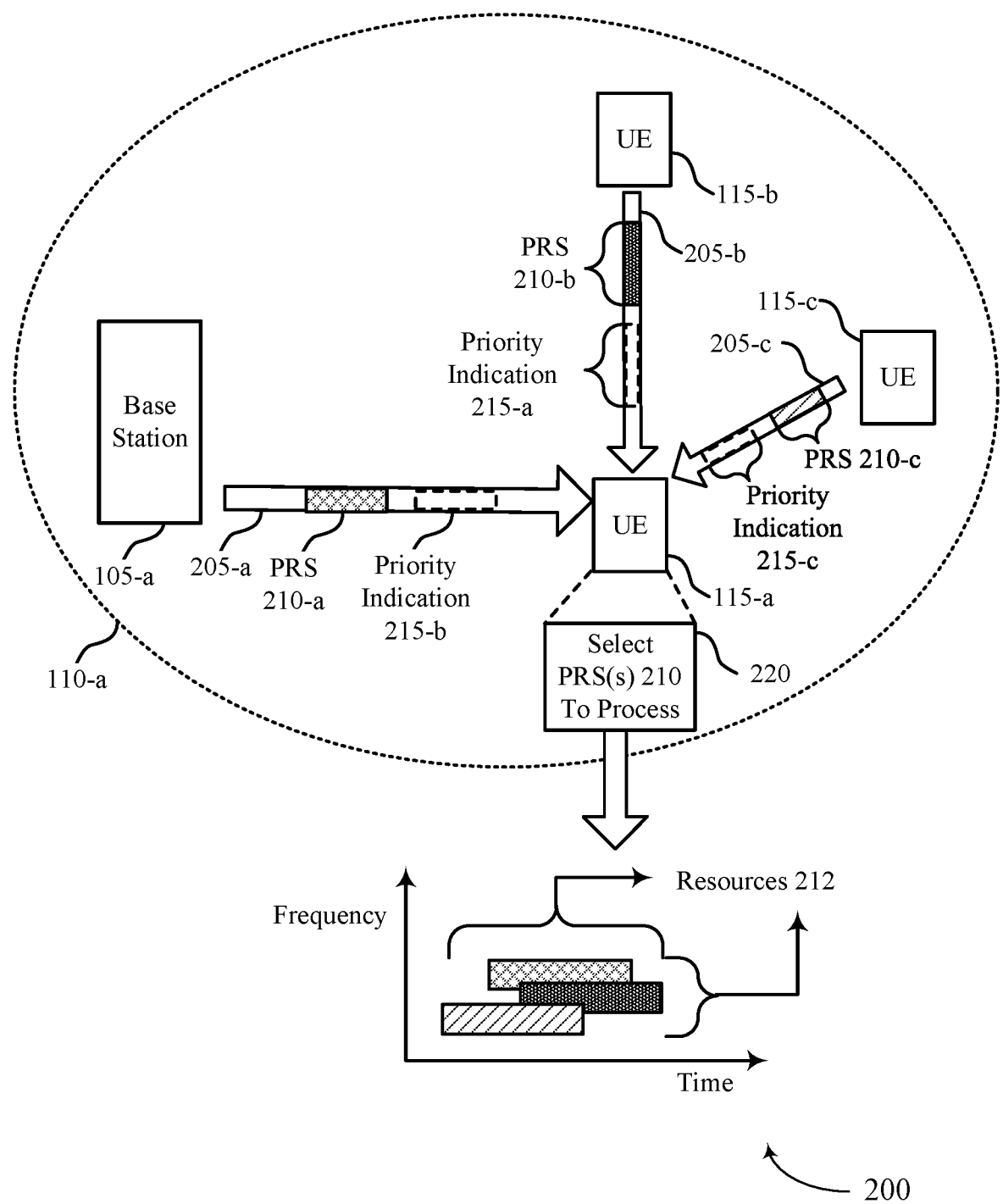

FIG. 2 illustrates an example of a wireless communications system 200 that supports processing PRSs according to priority in accordance with one or more aspects of the present disclosure. In some examples, the wireless communications system 200 may implement aspects of the wireless communications system 100. For example, the wireless communications system 200 may include UE 115-a, UE 115-b, UE 115-c, and a base station 105-a with coverage area 110-a, which may be examples of UEs 115 and a base station 105 with a coverage area 110 as described with reference to FIG. 1. In some examples, UE 115-a may communicate with one or more wireless devices via a communication link. For example, UE 115-a may receive data or control signaling via a downlink communication link 205. In some examples, UE 115-a may receive one or more PRSs 210, and may process or decode the PRSs 210 according to a priority.

The wireless communications system 200 may support both access links and sidelinks for communications between one or more communication devices. An access link may refer to a communication link between a UE 115 (such as, UE 115-a, UE 115-b and UE 115-c) and a base station 105-a. A sidelink may refer to any communication link between similar wireless devices (for example, a communication link between UEs 115, or a backhaul communication link between base stations 105). It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one UE 115 to one or more other UEs 115. In some examples, downlink communication links 205 may be examples of access links, sidelinks, or both.

In some examples, a base station 105 may communicate with one or more UEs 115 in a coverage area 110. For example, base station 105-a may communicate with UE 115-a through UE 115-c in coverage area 110-a. Additionally or alternatively, UE 115-a, UE 115-b, and UE 115-c may communicate with each other (or with another group of UEs 115) over sidelink communications, such as according to a P2P or D2D protocol. In some examples, the UE 115-a may transmit sidelink transmissions to the UE 115-b or the UE 115-c. In some examples, the UE 115-a or the UE 115-b may monitor resource pools for the sidelink communications or indications of the sidelink communications (for example, resource reservations, control channel transmissions, among other examples) from other UEs 115 in a group. Additionally or alternatively, the UEs 115 may have data to transmit to (or receive from) a UE 115 in the UE group and may use the sidelink communications to transmit the data transmission. That is, base station 105-a may transmit data for UE 115-a to relay to other UEs 115, such as UE 115-b or UE 115-c, via a sidelink communication link.

In some examples, a base station 105 or a UE 115 may be considered a wireless device or may act as an anchor node for one or more wireless devices. A wireless device may transmit a PRS 210 to another wireless device, such as a UE 115. For example, base station 105-a may transmit PRS 210-a to UE 115-a over downlink communication link 205-a, UE 115-b may transmit PRS 210-b to UE 115-a over downlink communication link 205-b, and UE 115-c may transmit PRS 210-c to UE 115-a over downlink communication link 205-c. UE 115-a may use the PRSs 210 to determine sidelink positioning of base station 105-a, UE 115-b, UE 115-c, or a combination thereof. In some examples, when UE 115-a receives a PRS 210 from a base station 105, the PRS 210 may be referred to as a Uu-PRS. In some other examples, when UE 115-a receives a PRS 210 from another UE 115, such as a sidelink anchor node or a non-anchor UE 115, the PRS 210 may be referred to as a sidelink-PRS (SL-PRS). In some cases, base station 105-a may be an anchor node for UE 115-a, and UE 115-b may be a sidelink anchor node for UE 115-a. The sidelink anchor node may be another UE 115 with relatively accurate position information.

In some deployment scenarios, one or more UEs 115 may experience relatively poor channel conditions, such as an out-of-coverage (OoC) condition, or may otherwise lack a line-of-sight (LOS) or other communication link with a network entity, and such UEs 115 may be unable to receive PRSs 210 that may be transmitted by a network entity. In some cases, for UEs 115 experiencing the relatively poor channel conditions (e.g., fewer LOS links with a base station 105), communicating with a sidelink anchor node may add additional LOS links. For example, indoor factory (InF) channels (e.g., InF-dense high (DH)/downlink) may have reduced base station LOS links. Thus, a UE 115 using the InF channels may communicate with an anchor node (e.g., a UE 115 with sufficient channel conditions) to improve overall positioning accuracy, such as by additional measurements. Using an anchor node for communications may improve power efficient for P2P positioning and ranging for public safety and other uses. Further, the anchor node may provide for a group of wireless devices in an out-of-coverage scenario to determine relative positions of each other. In some examples, sidelink sensing (e.g., positioning for a device-free object) may be performed in a joint framework with sidelink positioning.

For sidelink positioning or sidelink-assisted positioning, a receiving UE 115 may observe PRSs 210 from one or more sidelink and base station 105 anchor nodes. For example, UE 115-a may receive PRS 210-a from base station 105-a, which may be a Uu anchor node, and PRS 210-b from UE 115-b, which may be a sidelink or UE 115 anchor node. UE 115-a may also receive PRS 210-c from UE 115-c, which may or may not be an anchor node. In some cases, a sidelink anchor may be a sidelink node that obtains position and timing information from a global navigation satellite system (GNSS) or another base station 105 or sidelink anchor node. In some implementations, one or more aspects of sidelink communication may be associated with a distributed coordination of communications between UEs 115, such as when UEs 115 are in an OoC condition or otherwise lack a communications link with a network entity, or when UEs 115 perform sidelink communications using resources 212 that are allocated to or are otherwise available for selection or reservation by the UEs 115 (e.g., without the sidelink communications themselves being scheduled by a network entity). For example, a pool of resources 212, such as communication resources in the frequency domain, resources in the time domain, or a combination thereof, may be allocated by a network entity (e.g., during a communication link establishment or other configuration with the network), or allocated in accordance with a communications protocol or standard, and UEs 115 may contend for use of such resources 212 in accordance with various sensing and exclusion techniques. An example of such an allocation and reservation of resources 212 for sidelink communications may be referred to as a sidelink resource allocation Mode 2. Under such circumstances, reference signal transmissions, among other transmissions, may be aperiodic or semi-persistently scheduled (e.g., sent in response to a request).

In some cases, the resources 212 of PRSs 210 may collide (e.g., overlap in time and frequency). For example, PRS 210-b may overlap in time, frequency, or both with PRS 210-c. To reduce or eliminate the resource collision, at 220, UE 115-a may select a subset of PRSs 210 to process. The selection may be based on a rule to increase (e.g., maximize) the positioning and sensing performance of UE 115-a. In some examples, an anchor node may transmit a priority indication 215 to a sidelink device, the priority indication 215 including respective priorities for one or more PRSs 210. In some cases, UE 115-b may transmit a priority indication 215 to UE 115-a. The priority indication 215 may include a priority parameter for a PRS resource, a PRS resource set, or an anchor node. In some cases, the priority of a PRS 210 may be based on a reliability of the PRS 210. For example, an anchor node that obtains position and timing information directly from a GNSS may have a higher priority than another anchor node that obtains position and timing information from a base station 105 (e.g., via NR Uu positioning), from other anchor nodes, or both. In some other examples, a base station anchor node may have a higher priority than a sidelink anchor node, which may be referred to as cross-Uu-sidelink PRS priority.

In some cases, the priority of a PRS 210 may be based on defined rules, such as according to Table 1.

TABLE 1

| Priority | Priority rule 1 | Priority rule 2 |
| --- | --- | --- |
| P0 (highest) | Anchor synced with GNSS | Anchor synced with base station anchors |
| P1 | Anchor synced with base station anchors | Anchor synced with GNSS |
| P2 | Anchor synced with both base station and sidelink anchors | Anchor synced with both base station and sidelink anchors |
| P3 | Anchor synced with sidelink anchors | Anchor synced with sidelink anchors |

UE 115-a may select a rule among the defined (e.g., predetermined) set of rules. For example, UE 115-a may select priority rule 1 from Table 1 or priority rule 2 from Table 1 to follow. Additionally or alternatively, the priority may be a function of one or more parameters of the anchor node, such as positioning reliability (hardware capability, processing algorithm, etc.), PRS transmission parameters (error vector magnitude (EVM), transmit power, etc.), number and signal quality (e.g., reference signal received power (RSRP)) of observed anchors, speed and direction (e.g., for a mobile anchor node), type of the node (e.g., gNB, eNB, road side unit (RSU), vehicle, or handset), type of PRS 210 (e.g., periodic, semi-persistent, or aperiodic), band for the PRS 210 transmission (e.g., licensed or unlicensed band, which due to less uncertainty of channel access, licensed may be prioritized). In some cases, the network may indicate, via control signaling, the rule for UE 115-a to use.

In some examples, since the priority of one or more PRSs 210 may change over time, the anchor node may indicate the priority each time there is a change. For example, an anchor node, such as UE 115-b, may refine its positioning and timing information, or a mobile anchor node may change position. UE 115-b may send priority indication 215-a each time the position changes or the positioning and timing information is refined. UE 115-b may include priority indication 215-a in a dynamic indication, such as in an explicit indication. Similarly, base station 105-a may transmit priority indication 215-b for PRS 210-a, UE 115-c may transmit priority indication 215-c indicating a priority for PRS 210-c, or both. In some cases, UE 115-b, UE 115-c, base station 105-a, or a combination thereof may transmit respective control channels for a PRS 210 (e.g., PRS 210-a, PRS 210-b, PRS 210-c, or a combination thereof), which may be an aperiodic or semi-persistent PRS 210. The control channels may include a priority indication field in SCI (e.g., SCI format 1-A, which includes a 3 bit field for the priority indication). When SCI schedules a sidelink shared channel (e.g., a physical sidelink shared channel (PSSCH)), the priority field may indicate a quality of service (QoS) value for the scheduled data. In some examples, when the SCI triggers transmission of a PRS 210, the priority field may indicate the priority of the PRS 210, as well as a priority for resource reservation (e.g., rather than a QoS value when the SCI schedules a sidelink shared channel). Additionally or alternatively, a new field may be introduced in the SCI for the priority indication 215. In some other cases, UE 115-b may send the PRS 210 according to a scrambling sequence, a resource pattern, or the like, which may implicitly indicate priority of the PRS 210 to UE 115-a, which is described in further detail with respect to FIG. 3.

Base station 105-a, UE 115-b, UE 115-c, or a combination thereof may include a priority indication 215 in a semi-static indication, such as in an explicit indication. For example, UE 115-b may transmit priority indication 215-a via RRC signaling or a MAC-CE, such as for a periodic or semi-persist PRS 210. A coordinating hub or node (an anchor node, a base station 105, location management function (LMF), etc.) may assign a priority value to a configured PRS 210 at an anchor node level, such as at UE 115-b, positioning-frequency-layer, resource-set, or resource. The order UE 115-a may process the PRSs 210 or priority of the PRSs 210 may be implicit by the order in the list of PRSs 210 in the RRC information element (IE) or MAC-CE.

In some examples, the anchor node, such as UE 115-b, may broadcast a signal including a priority indication 215 (e.g., a position system information block (SIB), sidelink-synchronization signal block (S-SSB) with a sidelink-primary synchronization signal (S-PSS), sidelink-secondary synchronization signal (S-SSS), and physical sidelink broadcast channel (PSBCH)). The anchor node may also be used as a synchronization reference UE 115 for sidelink communications. The priority indication 215 may be implicitly included according to synchronization signal sequence (e.g., related to synchronization priority) or explicitly in a PSBCH payload. In some examples, a list of priority values may be semi-statically configured, and UE 115-b may select the priorities dynamically for priority indication 215-a.

In some cases, when a UE 115 observes PRSs 210 from multiple anchor nodes, such as at 220, the UE 115 may select a subset of the PRSs 210 for positioning and sensing. For example, UE 115-a may receive PRS 210-a through PRS 210-c and may select one or more of PRS 210-a through PRS 210-c to process. By processing a portion of the PRSs 210 (e.g., high priority PRSs 210), the positioning accuracy may be improved. In some cases, such as for a unicast PRS 210, the UE 115 may also request or report a priority value to the anchor node, or may override the priority value indicated by the anchor node. That is, UE 115-a may request, report, or override the priority indication 215 from UE 115-b. The priority may be based on one or more parameters of the anchor node, parameters of the receiving node (geometric dilution of precision (GDOP), LOS condition, RSRP etc.), or both. When multiple PRS resources 212 overlap in time or frequency, the UE 115 may prioritize the reception of PRS resources 212 with relatively higher priorities. For mmW operation (e.g., frequencies in the FR2 range), the UE 115 may determine a receive beam for a PRS 210 based on the priority indication 215.

Figure 3:
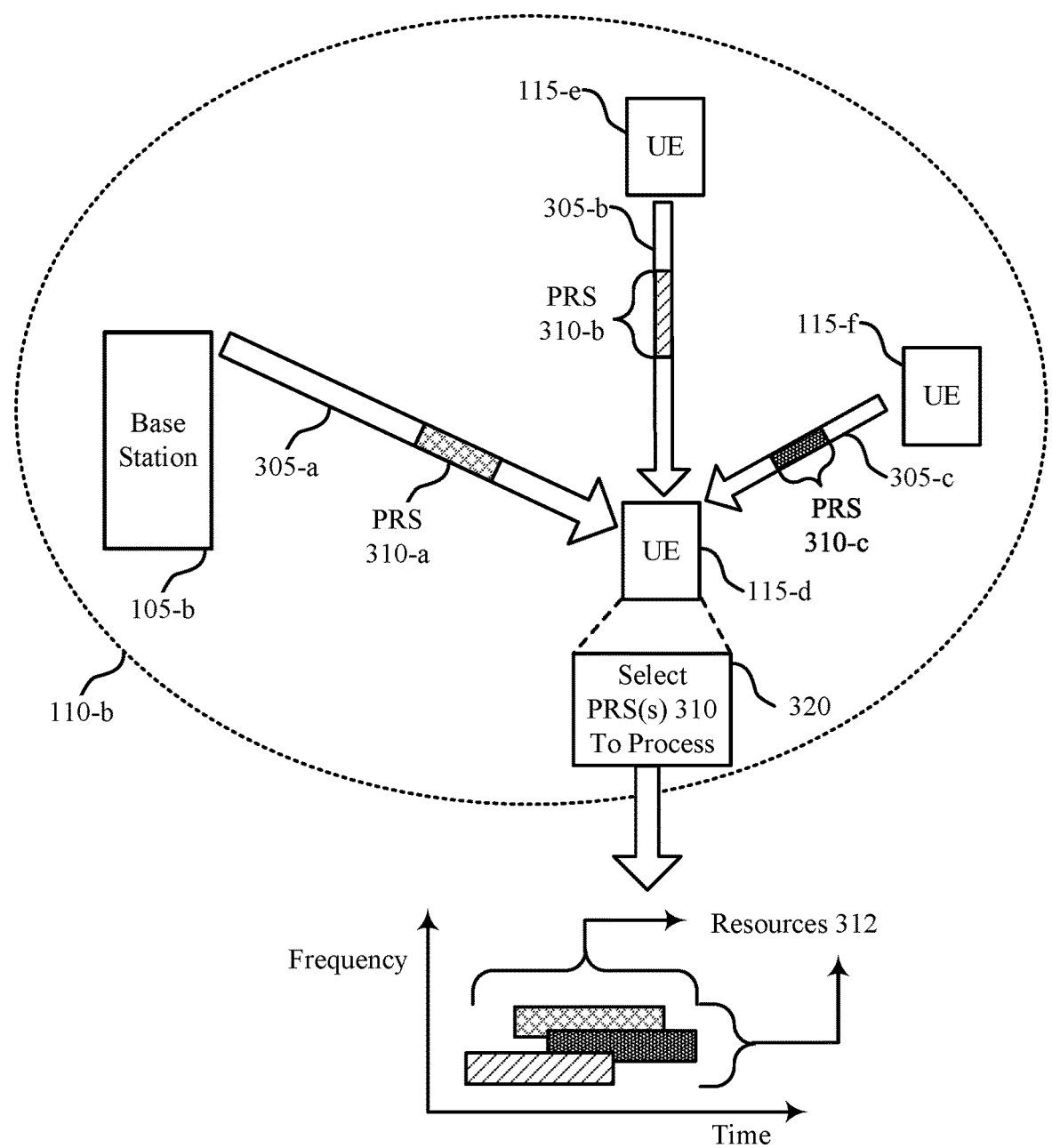

FIG. 3 illustrates an example of a wireless communications system 300 that supports processing PRSs according to priority in accordance with one or more aspects of the present disclosure. In some examples, the wireless communications system 300 may implement aspects of the wireless communications system 100 and the wireless communications system 200. For example, the wireless communications system 300 may include UE 115-d, UE 115-e, UE 115-f, and a base station 105-b with coverage area 110-b which may be examples of UEs 115 and a base station 105 with a coverage area 110 as described with reference to FIGS. 1 and 2. In some examples, UE 115-d may communicate with one or more wireless devices via a communication link. For example, UE 115-d may receive data or control signaling via a downlink communication link 305. In some examples, UE 115-d may receive one or more PRSs 310, and may process the PRSs 310 according to a priority.

In some examples, base station 105-b may communicate with UE 115-d through UE 115-f in coverage area 110-b. Additionally or alternatively, UE 115-d, UE 115-e, and UE 115-f may communicate with each other (or with another group of UEs 115) over sidelink communications, as described with reference to FIG. 2. In some examples, a base station 105, a UE 115, or both may act as an anchor node for one or more wireless devices. A wireless device may transmit a PRS 310 to another wireless device, such as a UE 115. For example, base station 105-b may transmit PRS 310-a to UE 115-d over downlink communication link 305-a, UE 115-e may transmit PRS 310-b to UE 115-d over sidelink communication link 305-b, and UE 115-f may transmit PRS 310-c to UE 115-d over sidelink communication link 305-c. The resources 312 of the PRSs 310 may overlap.

In some cases, one or more anchor nodes may send PRSs 310 according to a priority configuration 315 (e.g., scrambling sequence, a resource pattern, or the like) to implicitly indicate a priority of the PRSs 310 to a UE 115. For example, UE 115-e, UE 115-f, base station 105-b, or a combination thereof may be acting as anchor nodes for UE 115-d. UE 115-e, UE 115-f, base station 105-b, or a combination may send the PRSs 310 according to a scrambling sequence, a resource pattern, or the like, to UE 115-d. Base station 105-b may transmit PRS 310-a according to priority configuration 315-a, UE 115-e may transmit PRS 310-b according to priority configuration 315-b, UE 115-f may transmit PRS 310-c according to priority configuration 315-c, or a combination thereof. Each priority configuration 315 may include a respective scrambling sequence of a PRS 310, a resource pattern (comb type, comb offset, etc.) of the PRS 310, or the like.

In some examples, demodulation reference signal (DMRS) patterns may be configured or otherwise defined for use by a transmitter (e.g., 2, 3, 4, 9, and 12 symbol DMRS patterns). The transmitter may select a DMRS pattern, and signal the DMRS pattern in SCI (e.g., if more than one DMRS patterns are configured at a receiving device) according to channel conditions. In some examples, for a threshold number of symbols in a sidelink shared channel (e.g., a 12 symbol PSSCH), there may be a dedicated slot structure, which may be define a resource configuration, for PRSs 310. A slot may include a number of symbols, which may be time resources for transmission. Additionally or alternatively to the existing slot structures, the transmitting device may use a new slot structure. The slot, which may be a time period for a transmission, may include a PSSCH (e.g., SCI format 1 (SCI-1)), SCI format 2 (SCI-2), a DMRS, and a PRS 310 without a sidelink shared channel).

Each symbol of the PRS may have a comb-structure in frequency, such that the PRS 310 may use one or more frequencies. In some cases, a PRS 310 may have a structure with a staggered comb pattern (e.g., skipping over one or more frequencies), which is described in further detail with respect to FIGS. 4A and 4B. A candidate slot and PRS pattern may be configured or otherwise defined and indicated by a control signal (e.g., SCI-2). In some cases, PRS slots may have different transmission power and timing from other sidelink transmissions. PRS power and timing may also be different within a slot compared to a PSCCH, SCI-2, DMRS, and the like. In some examples, an anchor node may include a gap symbol within a slot before and after a PRS burst.

In some examples, at 320, UE 115-d may select one or more PRSs 310 to process based on the priority indications of each PRS 310. For example, UE 115-d may select one or more of PRS 310-a, PRS 310-b, and PRS 310-c, to process to avoid resource 312 collision.

Figure 4A:
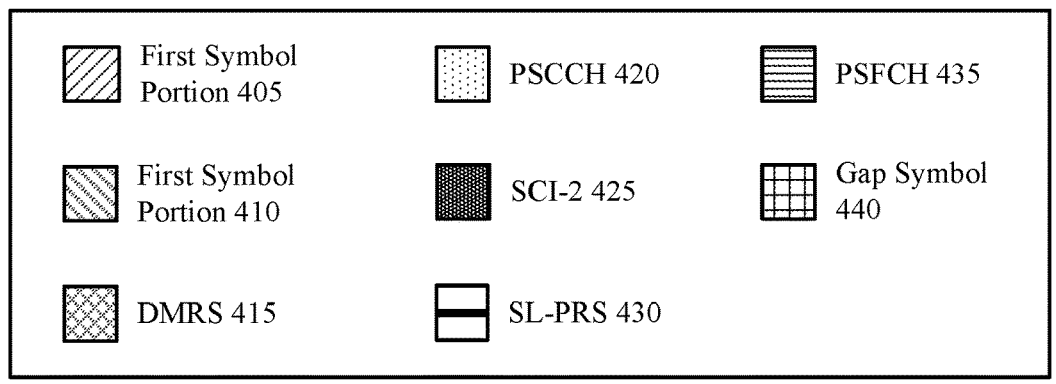
FIGS. 4A and 4B illustrate example resource diagrams that support processing PRSs according to priority in accordance with one or more aspects of the present disclosure.
Figure 4A:
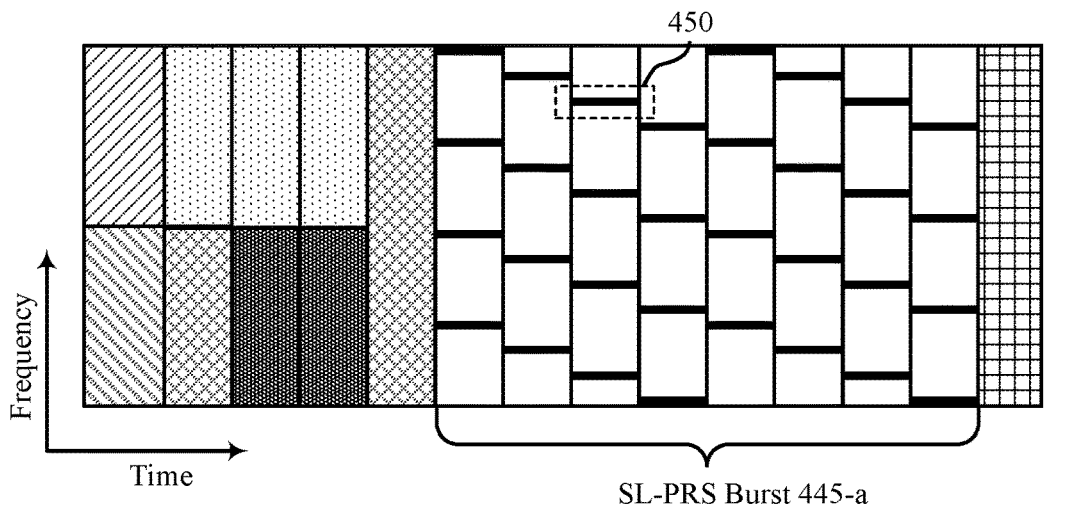
Figure 4B:
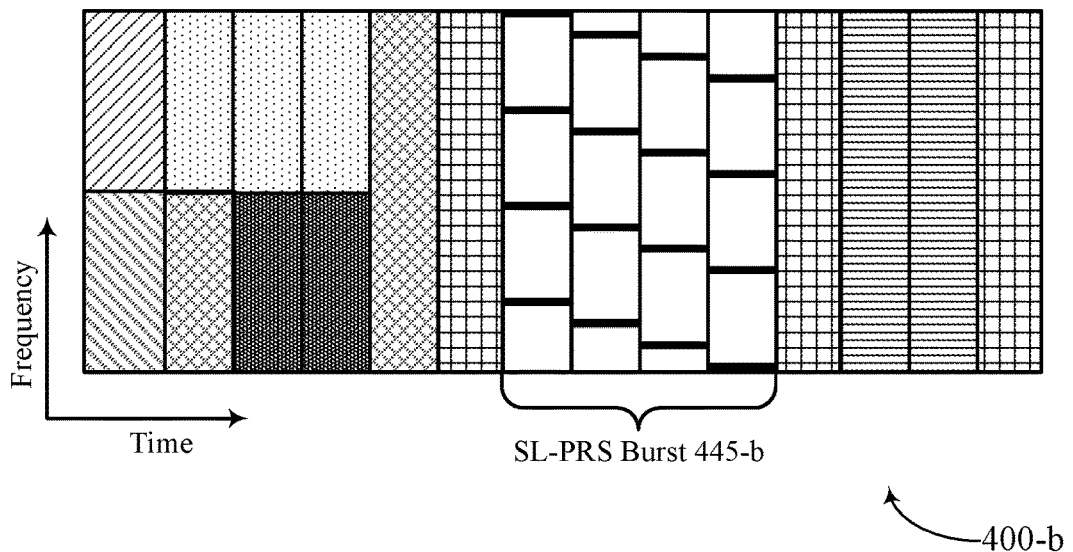

FIGS. 4A and 4B illustrate examples of resource diagrams 400 that support processing PRSs according to priority in accordance with one or more aspects of the present disclosure. The resource diagrams 400-a and 400-b may implement or be implemented to realize aspects of the wireless communications system 100, the wireless communications system 200, or the wireless communications system 300. For example, one or both of the resource diagrams 400-a or 400-b may be an example of a slot format that is dedicated for SL-PRS transmission, and a UE 115 may transmit an SL-PRS 430, or receive an SL-PRS 430, in accordance with the resource diagram 400-a or the resource diagram 400-b. In some implementations, such UEs 115 may be examples of UEs 115 as described with reference to FIG. 1 through FIG. 3.

The resource diagram 400-a may represent a 12-symbol pattern and the resource diagram 400-b may represent a 9-symbol pattern. In some implementations, the resource diagrams 400-a and 400-b may be introduced for (such as available for) sidelink communications in addition to other slot formats, but the resource diagrams 400-a and 400-b may be dedicated for SL-PRS transmissions. The resource diagrams 400-*a* and 400-*b* may include a first symbol portion 405 and a first symbol portion 410, one or more DMRSs 415, a PSCCH 420 (carrying SCI-1), SCI-2 425, an SL-PRS burst 445 including the SL-PRS 430, and one or more gap symbols 440. In some implementations, a first symbol portion 405 may be a repetition of a PSCCH 420, and a first symbol portion 410 may be a repetition of a DMRS 415 (for example, in a slot format associated with 14 total symbol durations). As shown in FIG. 4A and FIG. 4B, respectively, the resource diagram 400-*a* may include an SL-PRS burst 445-*a* spanning eight symbols and the resource diagram 400-*b* may include an SL-PRS burst 445-*b* spanning four symbols. In some implementations, the resource diagrams 400-*a* and 400-*b* may lack or be absent of a PSSCH. For example, instead of including a PSSCH portion, the resource diagrams 400-*a* and 400-*b* may include a portion dedicated for an SL-PRS burst 445.

The SL-PRS 430, which a UE 115 may transmit during an SL-PRS burst 445 (a set of consecutive symbols), may feature or otherwise be associated with a transmission pattern, such as a staggered comb pattern, where the SL-PRS 430 may be distributed on different subsets of frequency resources in successive symbol durations. In some implementations, the SL-PRS 430 may feature or be associated with a similar structure or pattern as a Uu-PRS. In some implementations, one or both of a candidate slot and the SL-PRS pattern may be configured (for example, pre-configured) at a UE 115 transmitting an SL-PRS 430, or a UE 115 receiving an SL-PRS 430 may receive control signaling (such as SCI-2) indicating one or both of the candidate slot and the SL-PRS pattern.

In some implementations, a UE 115 may use a different transmit power or different timing for SL-PRS slots (slots transmitted in accordance with the resource diagram 400-*a* or the resource diagram 400-*b*) as compared to other sidelink transmissions. For example, a UE 115 may use a different transmit power for signaling sent during an SL-PRS slot or an SL-PRS slot may span a different amount of time (such as a different quantity of symbols) than other slots, such as slots including a PSSCH portion. In some examples in which the UE 115 uses a different transmit power for signaling sent during an SL-PRS slot, the UE 115 may use a different transmit power control procedure (such as a transmit power control procedure that is dedicated for SL-PRS slots) than another transmit power control procedure used for other signaling (such as for a sidelink slot including a PSSCH). In other words, the UE 115 may use a first transmit power control procedure that is associated with a first target receive power and a first pathloss compensation factor for SL-PRS slots and the UE 115 may use a second transmit power control procedure that is associated with a second target receive power and a second pathloss compensation factor for slots including a PSSCH. In some examples in which the UE 115 uses different timing for SL-PRS slots than for slots including a PSSCH, the UE 115 may use different timing synchronization (associated with a synchronization source) for the different types of slots. For example, for a PSSCH transmission, the UE 115 may use a transmission timing that is relative to timing obtained from a network entity or another sidelink node (via a synchronization signal, such as an SSB), but, for an SL-PRS transmission, the UE 115 may use a transmission timing that is relative to an absolute time obtained from a GNSS.

Additionally or alternatively, the first UE 115 may transmit the SL-PRS 430 using a different transmit power or different timing than other signaling sent within that SL-PRS slot. For example, a UE 115 may transmit the SL-PRS 430 using a different transmit power or different timing (for example, may define symbol durations differently for an SL-PRS burst 445 than other symbols within the SL-PRS slot) than the UE 115 uses for the first symbol portion 405, the first symbol portion 410, the one or more DMRSs 415, the PSCCH 420, the SCI-2 425, or the PSFCH 435, or any combination thereof. In such examples, the UE 115 may use a slot format (such as the resource diagram 400-*b*) that provides one or more gap symbols 440 during which the UE 115 may adjust one or both of a transmit power or a transmit timing. For example, the resource diagram 400-*b* may include a gap symbol 440 before an SL-PRS burst 445 and a gap symbol 440 after the SL-PRS burst 445-*b* and the UE 115 may adjust a transmit power of the UE 115 during those gap symbols 440.

To support the resource diagrams 400-*a* and 400-*b* and efficient SL-PRS measurement and reporting, the SCI-1 (sent using the PSCCH 420) or the SCI-2 425, or both, may include information specific to SL-PRS transmission, such as one or more fields for positioning assistant data, in addition to other SCI fields. For example, the SCI-1 or the SCI-2 425 associated with the resource diagrams 400-*a* and 400-*b* may have different formats that are dedicated or specific for SL-PRS slots. For example, a UE 115 may transmit, via one or both of SCI-1 or SCI-2 425, an indication of its position such that SCI-1 or SCI-2 425 includes the position of the transmitter (which may be an example of a sidelink anchor node). In some implementations, instead of a rough position (such as a zone identifier), a UE 115 transmitting an SL-PRS may include a relatively more accurate geographic position (such as a position determined or inferred from GNSS signaling) in SCI. To reduce overhead, the UE 115 may signal the relatively more accurate position at the beginning (at transmission of a temporally first or initial SL-PRS 430) and may signal time-variation (relative to the initially reported position) thereafter.

Additionally or alternatively, a UE 115 may signal a transmission time stamp (such as an accurate transmission time stamp) via SCI for range or pseudo-range measurement. Additionally or alternatively, a UE 115 may signal a pattern of the SL-PRS 430 (if more than one pattern is configured, such as via previous SCI, MAC-CE, or RRC signaling) via SCI. In implementations in which a UE 115 signals the pattern of the SL-PRS 430 via SCI, the first UE 115 may dynamically indicate a scrambling sequence associated with an SL-PRS pattern. Additionally or alternatively, a UE 115 may indicate changes in SL-PRS patterns in accordance with a configured (for example, pre-configured) pattern for resource reuse (for example, such that SL-PRS 430 uses a resource that also may be allocated to another, remote or relatively distant UE 115) or in accordance with interference randomization. In some implementations, a UE 115 also may indicate a pattern of a responding or responsive SL-PRS 430 (for RTT-based sidelink positioning) or a transmit power of the SL-PRS 430 (for signal strength-based, such as RSRP-based, positioning or sensing). In some implementations, some of the positioning data associated with a UE 115 transmitting an SL-PRS may be configured (for example, preconfigured) at one or more receiving UEs 115 and, in such implementations, the transmitting UE 115 may refrain from dynamically indicating such positioning information.

Figure 5:
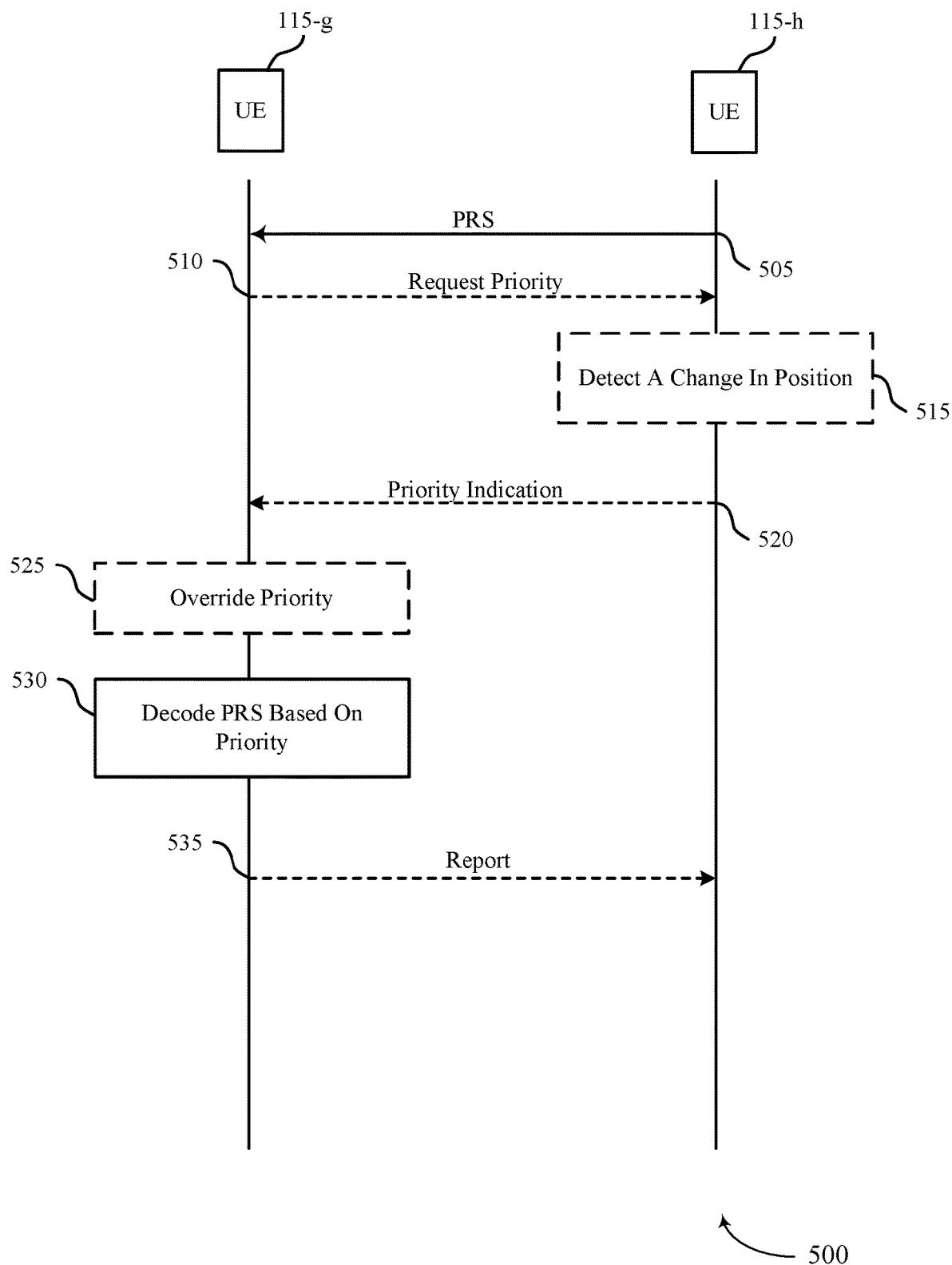
FIG. 5 illustrates an example of a process flow that supports processing PRSs according to priority in accordance with one or more aspects of the present disclosure.

In some cases, one or more anchor nodes may send one or more SL-PRSs 430 according to a resource pattern to implicitly indicate a priority of the SL-PRSs 430 to a UE. For example, SL-PRS burst 445-*a* may indicate a first priority, while SL-PRS burst 445-*b* may indicate a second priority different from the first. A priority, or priority parameter, may be associated with an SL-PRS resource 450 or an SL-PRS resource set (e.g., resources for SL-PRS burst 445-*a*). FIG. 5 illustrates an example of a process flow 500 that supports processing PRSs according to priority in accordance with one or more aspects of the present disclosure. In some examples, process flow 500 may implement aspects of wireless communications system 100, wireless communications system 200, wireless communication system 300, and resource diagrams 400. The process flow 500 may illustrate an example of a UE 115-*g* and an anchor node, such as UE 115-*h*, which may be examples of UEs 115 as described with reference to FIG. 1. In some examples, UE 115-*g* may process one or more PRSs from a set of PRSs based on respective priorities. Alternative examples of the following may be implemented, where some processes are performed in a different order than described or are not performed. In some cases, processes may include additional features not mentioned below, or further processes may be added.

At 505, UE 115-*h*, which may be an anchor node, may transmit one or more PRSs to UE 115-*g*. UE 115-*g* may receive PRSs from multiple anchor nodes (e.g., including UE 115-*h*) over a set of resources. The resources may be time and frequency resources. In some cases, UE 115-*g*, UE 115-*h*, or both may be sidelink devices.

In some examples, at 510, UE 115-*g* may transmit a request for one or more priorities of the PRSs. The priorities may be respective priorities of each PRS (e.g., each PRS may have a priority).

At 515, UE 115-*h* may detect a change in position, which may cause UE 115-*h* to adjust a priority of one or more PRSs.

At 520, UE 115-*g* may receive an indication of the respective priorities for one or more PRSs. In some cases, the indication may be dynamic, semi-static, or both. The indication may be explicit, such as included in one or more control channels with the PRSs. The control channels may include SCIs with a priority field (e.g., a new field or reusing an existing field) that indicates a priority of a PRS for each control channel. In some cases, UE 115-*g* may receive at least one control channel with a list of the one or more PRSs, the list ordered according to the respective priorities. In some examples, the indication may be implicit. For example, UE 115-*h* may transmit the PRSs by scrambling them according to respective scrambling sequences. The respective scrambling sequences may indicate the respective priorities for the one or more PRSs. Similarly, UE 115-*h* may receive the PRSs according to respective resource mapping patterns, which may indicate the respective priorities for the one or more PRSs.

In some cases, UE 115-*g* may receive one or more broadcast signals from anchor nodes, such as UE 115-*h*, indicating the respective priorities for the PRSs. For example, a payload or a sequence of the one or more broadcast signals may indicate the respective priorities. UE 115-*g* may receive a configuration message with a list of priorities, where the respective priorities for the PRSs are based on the list of priorities. UE 115-*g* may receive one or more priority parameters that indicate the respective priorities for the PRSs based on one or more resources, an anchor node of the one or more anchor nodes, a reliability of a positioning reference signal of the one or more positioning reference signals, or a combination thereof.

At 525, UE 115-*g* may determine to override the respective priority for the PRSs based on one or more parameters of UE 115-*g*.

At 530, UE 115-*g* may select one or more PRSs to decode based on the priority indication. For example, UE 115-*g* may select PRSs with relatively higher priority to process. UE 115-*g* may select the PRSs based on a priority rule for obtaining the positioning information, a capability of UE 115-*g*, a priority of the selected PRSs being greater than others (e.g., other PRSs with overlapping resources), or a combination thereof. The priority rules may be configured or otherwise defined at UE 115-*g*, UE 115-*h*, or both. UE 115-*g* may decode at least one PRS to obtain positioning information of UE 115-*g* (e.g., relative to UE 115-*h*).

At 535, UE 115-*g* may transmit a report including a priority of the selected PRSs. In some cases, the respective priorities may be based on a type of an anchor node of the one or more anchor nodes, positioning reliability information of the anchor node, transmission parameters for the anchor node, a signal quality parameter for the anchor node, a mobility parameter of the anchor node (e.g., speed and direction), a type of a positioning reference signal, a band type for the positioning reference signal, or a combination thereof. The positioning reliability information may include a hardware capability, a processing algorithm, or the like. The type of the PRS may be periodic, semi-persistent, or aperiodic. The band type of the PRS may be licensed or unlicensed (e.g., due to uncertainty of channel access).

FIG. 5 shows a block diagram 600 of a device 605 that supports processing PRSs according to priority in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to processing PRSs according to priority). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to processing PRSs according to priority). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of processing PRSs according to priority as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from one or more anchor nodes, a set of PRSs over a set of resources. The communications manager 620 may be configured as or otherwise support a means for receiving one or more indications that indicate a respective priority for each of one or more PRSs of the set of PRSs. The communications manager 620 may be configured as or otherwise support a means for decoding at least one PRS of the set of PRSs to obtain positioning information associated with the UE, the at least one PRS based on the respective priorities for the one or more PRSs.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for a UE to process PRSs according to priority, which may reduce processing performed by the UE, thereby reducing power consumption, which may enable more efficient utilization of resources including network resources.

Figure 6:
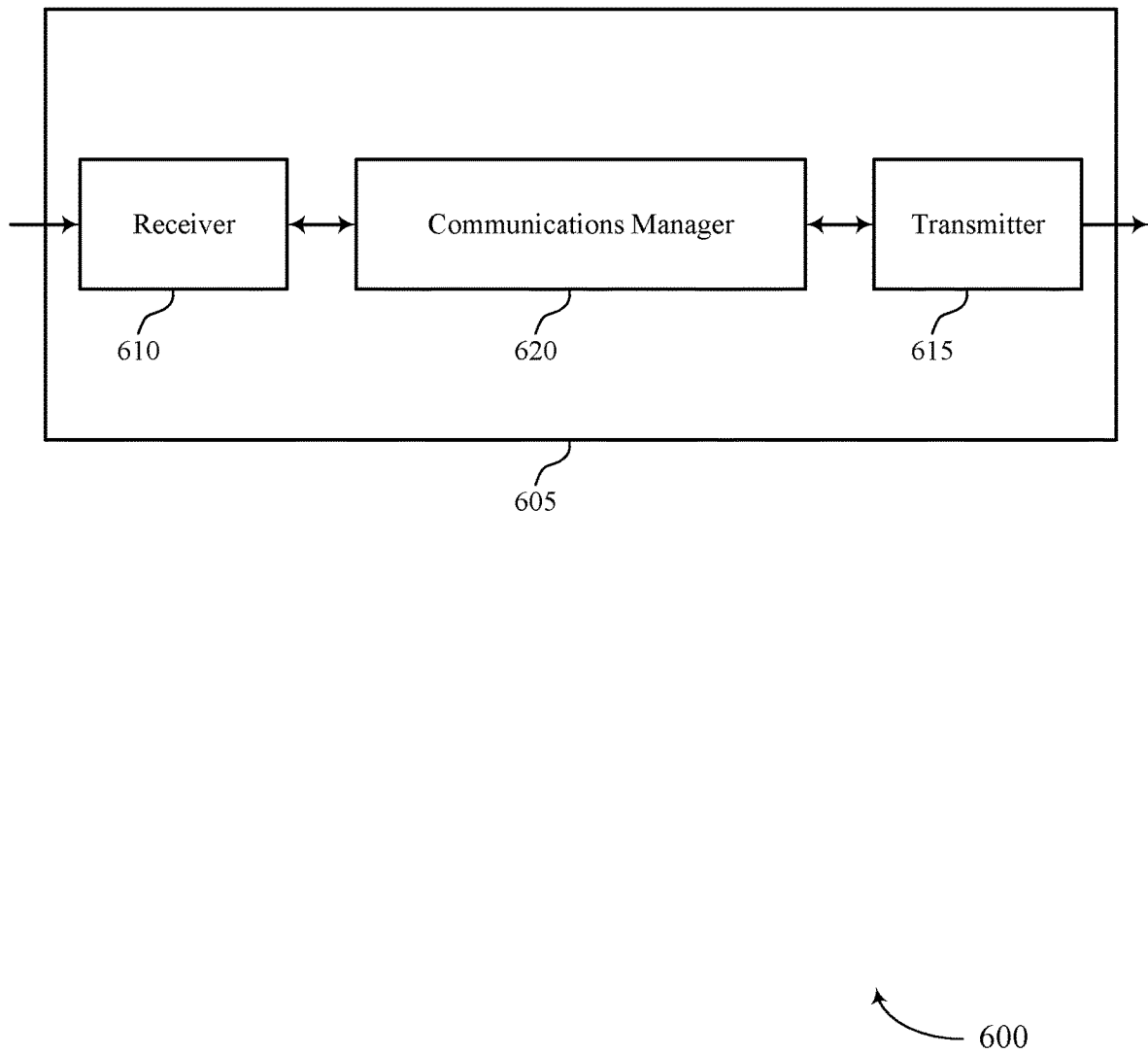
FIGS. 6 and 7 show block diagrams of devices that support processing PRSs according to priority in accordance with one or more aspects of the present disclosure.

FIG. 6 shows a block diagram 700 of a device 705 that supports processing PRSs according to priority in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to processing PRSs according to priority). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to processing PRSs according to priority). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of processing PRSs according to priority as described herein. For example, the communications manager 720 may include an PRS component 725, a priority component 730, a positioning component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The PRS component 725 may be configured as or otherwise support a means for receiving, from one or more anchor nodes, a set of PRSs over a set of resources. The priority component 730 may be configured as or otherwise support a means for receiving one or more indications that indicate a respective priority for each of one or more PRSs of the set of PRSs. The positioning component 735 may be configured as or otherwise support a means for decoding at least one PRS of the set of PRSs to obtain positioning information associated with the UE, the at least one PRS based on the respective priorities for the one or more PRSs.

Figure 7:
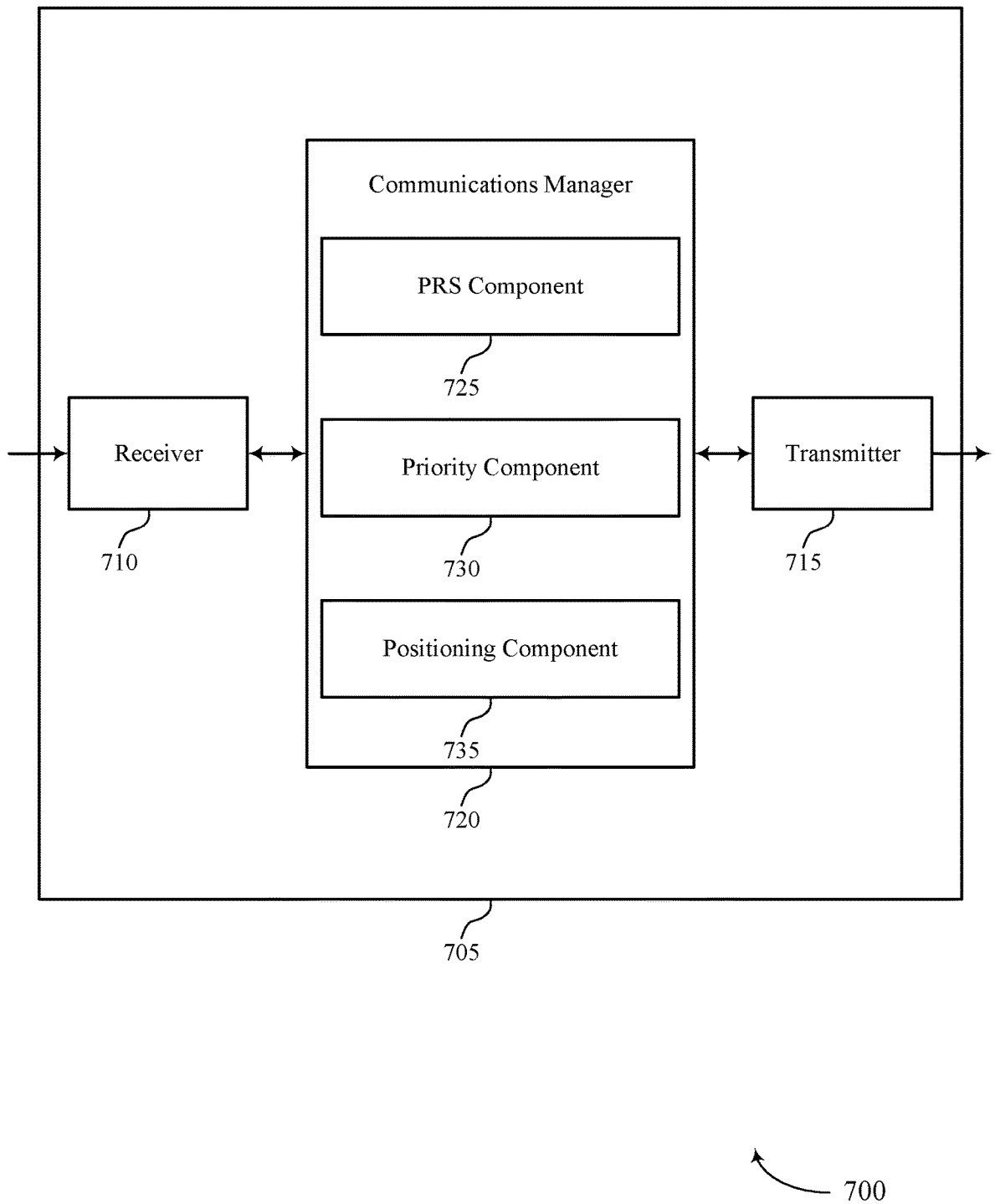
Figure 8:
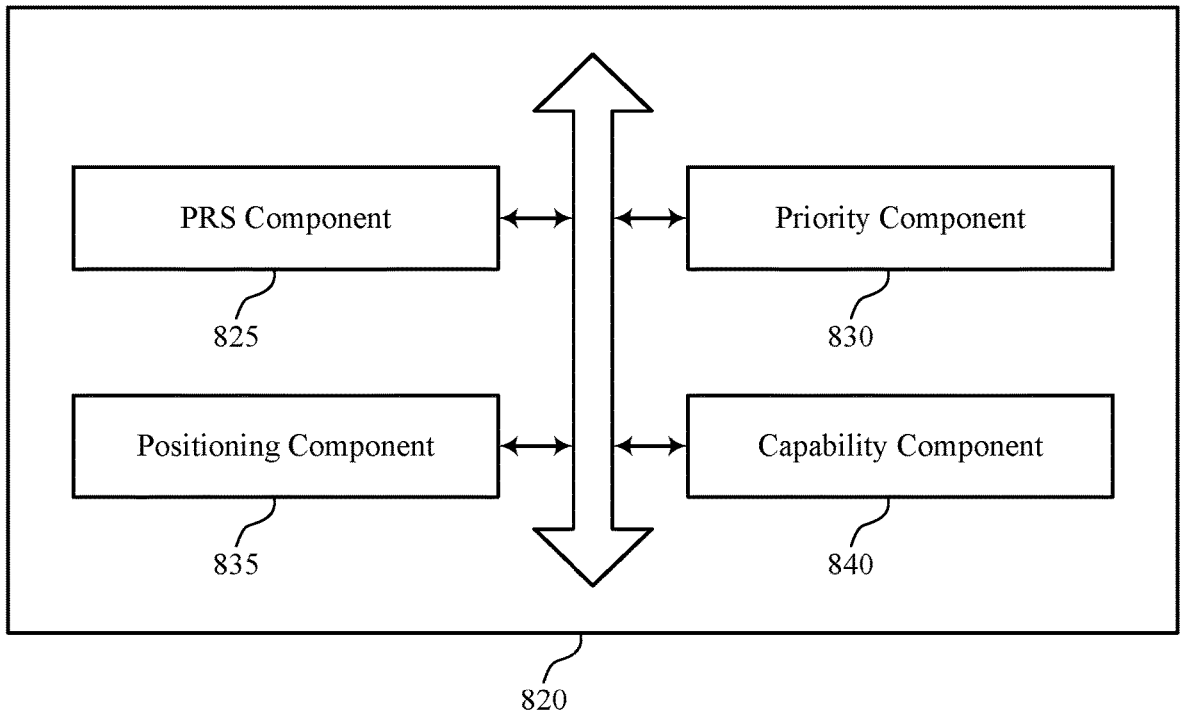
FIG. 8 shows a block diagram of a communications manager that supports processing PRSs according to priority in accordance with one or more aspects of the present disclosure.

FIG. 7 shows a block diagram 800 of a communications manager 820 that supports processing PRSs according to priority in accordance with one or more aspects of the present disclosure. The communications manager 820 may be an example of aspects of a communications manager 620, a communications manager 720, or both, as described herein. The communications manager 820, or various components thereof, may be an example of means for performing various aspects of processing PRSs according to priority as described herein. For example, the communications manager 820 may include an PRS component 825, a priority component 830, a positioning component 835, a capability component 840, or any combination thereof. Each of these components may communicate, directly or indirectly, with one another (e.g., via one or more buses).

The communications manager 820 may support wireless communication at a UE in accordance with examples as disclosed herein. The PRS component 825 may be configured as or otherwise support a means for receiving, from one or more anchor nodes, a set of PRSs over a set of resources. The priority component 830 may be configured as or otherwise support a means for receiving one or more indications that indicate a respective priority for each of one or more PRSs of the set of PRSs. The positioning component 835 may be configured as or otherwise support a means for decoding at least one PRS of the set of PRSs to obtain positioning information associated with the UE, the at least one PRS based on the respective priorities for the one or more PRSs.

In some examples, the PRS component 825 may be configured as or otherwise support a means for receiving the set of PRSs, the set of PRSs scrambled according to a respective scrambling sequence for each of the one or more PRSs, where the respective scrambling sequence indicates the respective priority.

In some examples, the PRS component 825 may be configured as or otherwise support a means for receiving the set of PRSs according to respective resource mapping patterns, where the respective resource mapping patterns for the one or more PRSs indicate the respective priority for each of the one or more PRSs.

In some examples, the priority component 830 may be configured as or otherwise support a means for receiving one or more control channels associated with the one or more PRSs, where the one or more control channels indicate the respective priority for each of the one or more PRSs.

In some examples, a control channel of the one or more control channels includes sidelink control information having a priority field that indicates a priority of a PRS associated with the control channel.

In some examples, the priority component 830 may be configured as or otherwise support a means for receiving at least one control channel including a list associated with the one or more PRSs, the list ordered according to the respective priorities.

In some examples, the priority component 830 may be configured as or otherwise support a means for receiving, from the one or more anchor nodes, one or more broadcast signals indicating the respective priorities for the one or more PRSs, where a payload or a sequence of the one or more broadcast signals indicates the respective priorities.

In some examples, the priority component 830 may be configured as or otherwise support a means for receiving a configuration message including a list of priorities, where the respective priorities for the one or more PRSs are based on the list of priorities.

In some examples, the priority component 830 may be configured as or otherwise support a means for receiving one or more priority parameters that indicate the respective priority for each of the one or more PRSs, the respective priorities based on the set of resources, a resource of the set of resources, an anchor node of the one or more anchor nodes, a reliability of a PRS of the one or more PRSs, or a combination thereof.

In some examples, the priority component 830 may be configured as or otherwise support a means for selecting the at least one PRS from the one or more PRSs based on a priority rule for obtaining the positioning information associated with the UE and the indication of the respective priorities for the one or more PRSs.

In some examples, the capability component 840 may be configured as or otherwise support a means for selecting the at least one PRS from the one or more PRSs based on a capability of the UE.

In some examples, the priority component 830 may be configured as or otherwise support a means for selecting the at least one PRS based on a priority of the at least one PRS being greater than a priority of a second PRS of the one or more PRSs, where one or more resources of the at least one PRS overlap with one or more resources of the second PRS.

In some examples, the priority component 830 may be configured as or otherwise support a means for transmitting a report including a priority of the at least one PRS, where the priority is based on one or more parameters associated with the UE.

In some examples, the priority component 830 may be configured as or otherwise support a means for transmitting a request for a priority of the at least one PRS.

In some examples, the priority component 830 may be configured as or otherwise support a means for determining to override the respective priority for the at least one PRS based on one or more parameters of the UE. In some examples, the PRS component 825 may be configured as or otherwise support a means for selecting the at least one PRS based on determining to override the respective priority for the at least one PRS.

In some examples, the respective priorities are based on a type of an anchor node of the one or more anchor nodes, positioning reliability information associated with the anchor node, transmission parameters associated with the anchor node, a signal quality parameter associated with the anchor node, a mobility parameter of the anchor node, a type of a PRS, a band type for the PRS, or a combination thereof.

Figure 9:
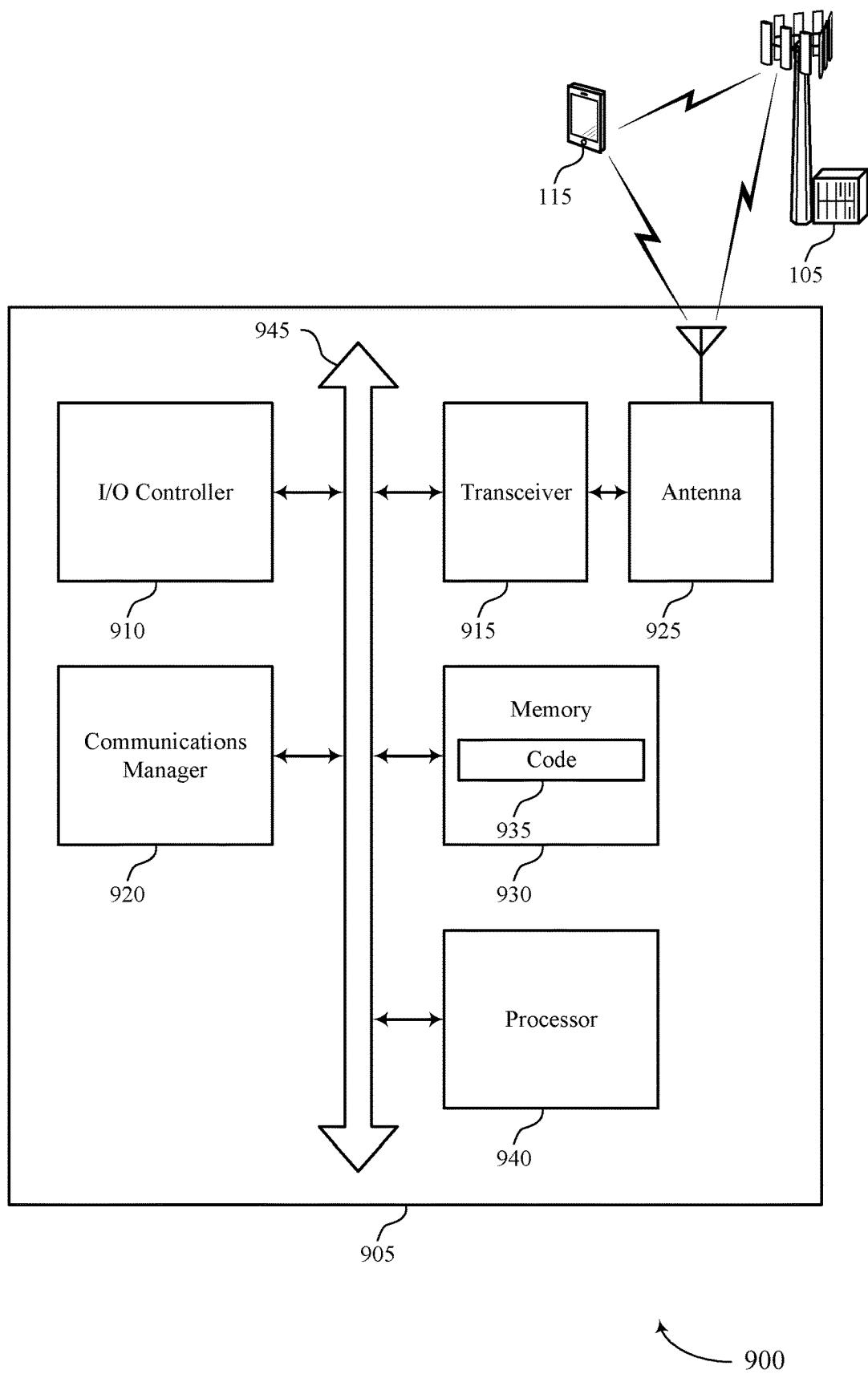
FIG. 9 shows a diagram of a system including a device that supports processing PRSs according to priority in accordance with one or more aspects of the present disclosure.

FIG. 9 shows a diagram of a system 900 including a device 905 that supports processing PRSs according to priority in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting processing PRSs according to priority). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from one or more anchor nodes, a set of PRSs over a set of resources. The communications manager 920 may be configured as or otherwise support a means for receiving one or more indications that indicate a respective priority for each of one or more PRSs of the set of PRSs. The communications manager 920 may be configured as or otherwise support a means for decoding at least one PRS of the set of PRSs to obtain positioning information associated with the UE, the at least one PRS based on the respective priorities for the one or more PRSs.

By including or configuring the communications manager 920 in accordance with examples as described herein, the device 905 may support techniques for a UE to process PRSs according to priority, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of processing PRSs according to priority as described herein, or the processor 940 and the memory 930 may be otherwise configured to perform or support such operations.

Figure 10:
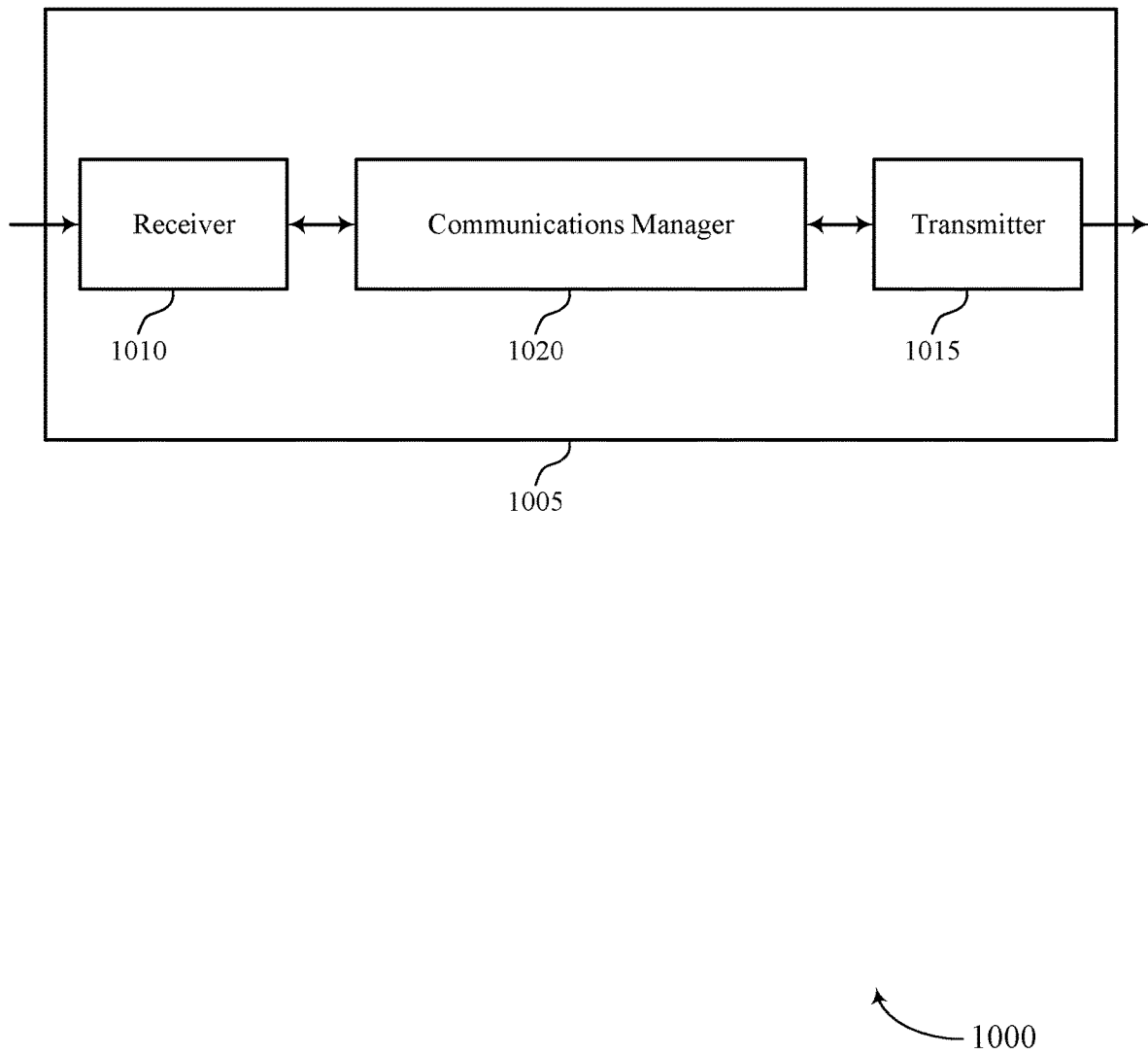
FIGS. 10 and 11 show block diagrams of devices that support processing PRSs according to priority in accordance with one or more aspects of the present disclosure.
Figure 11:
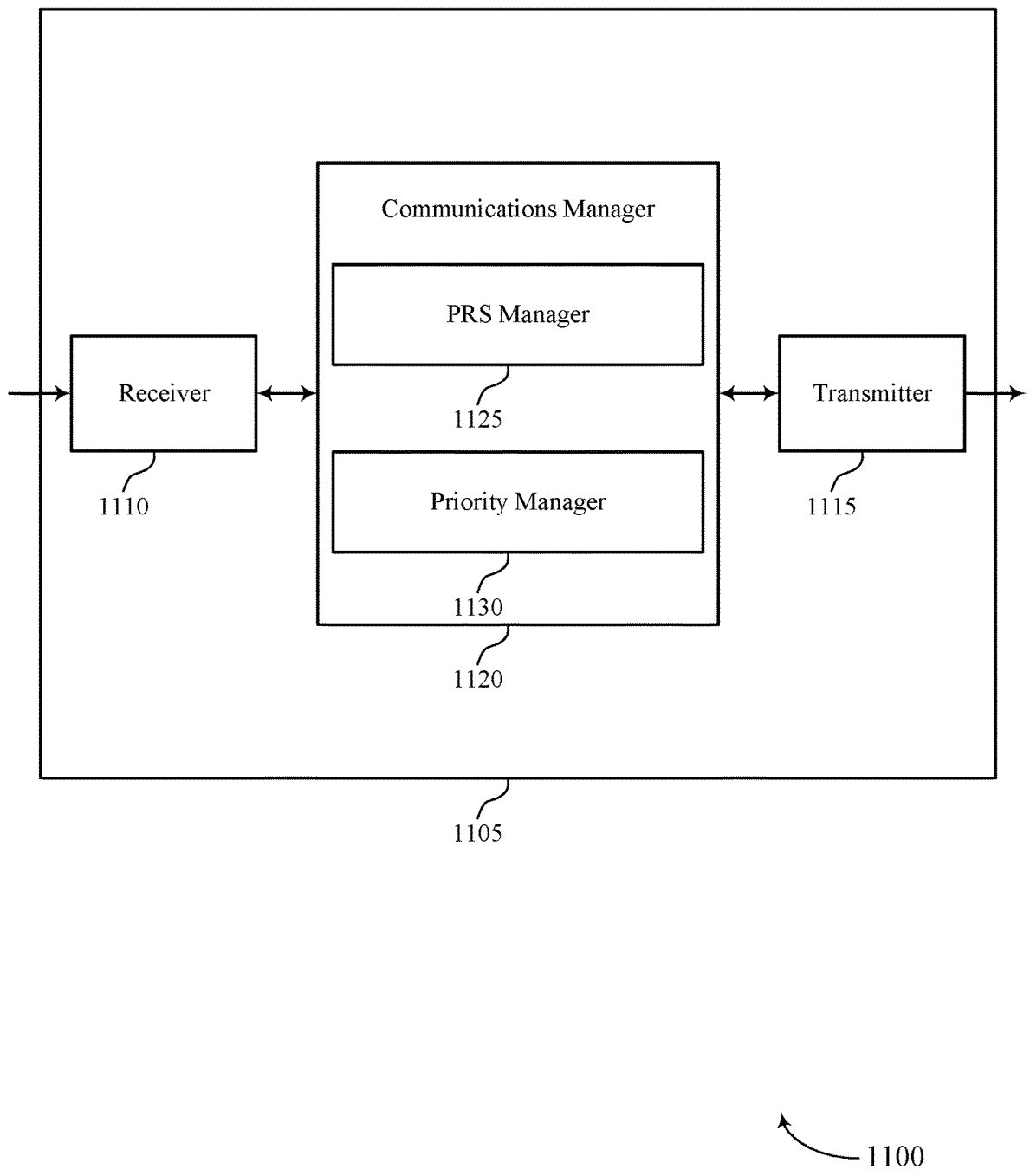

FIG. 10 shows a block diagram 1000 of a device 1005 that supports processing PRSs according to priority in accordance with one or more aspects of the present disclosure. The device 1005 may be an example of aspects of an anchor node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to processing PRSs according to priority). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to processing PRSs according to priority). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of processing PRSs according to priority as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at an anchor node in accordance with examples as disclosed herein. For example, the communications manager 1020 may be configured as or otherwise support a means for transmitting, to a UE, a set of PRSs over a set of resources. The communications manager 1020 may be configured as or otherwise support a means for transmitting, to the UE, one or more indications that indicate a respective priority for each of one or more PRSs of the set of PRSs.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for a UE to process PRSs according to priority, which may cause reduced processing, reduced power consumption, more efficient utilization of communication resources, and the like.

FIG. 10 shows a block diagram 1100 of a device 1105 that supports processing PRSs according to priority in accordance with one or more aspects of the present disclosure. The device 1105 may be an example of aspects of a device 1005 or an anchor node 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to processing PRSs according to priority). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to processing PRSs according to priority). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of processing PRSs according to priority as described herein. For example, the communications manager 1120 may include an PRS manager 1125 a priority manager 1130, or any combination thereof. The communications manager 1120 may be an example of aspects of a communications manager 920 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at an anchor node in accordance with examples as disclosed herein. The PRS manager 1125 may be configured as or otherwise support a means for transmitting, to a UE, a set of PRSs over a set of resources. The priority manager 1130 may be configured as or otherwise support a means for transmitting, to the UE, one or more indications that indicate a respective priority for each of one or more PRSs of the set of PRSs.

Figure 12:
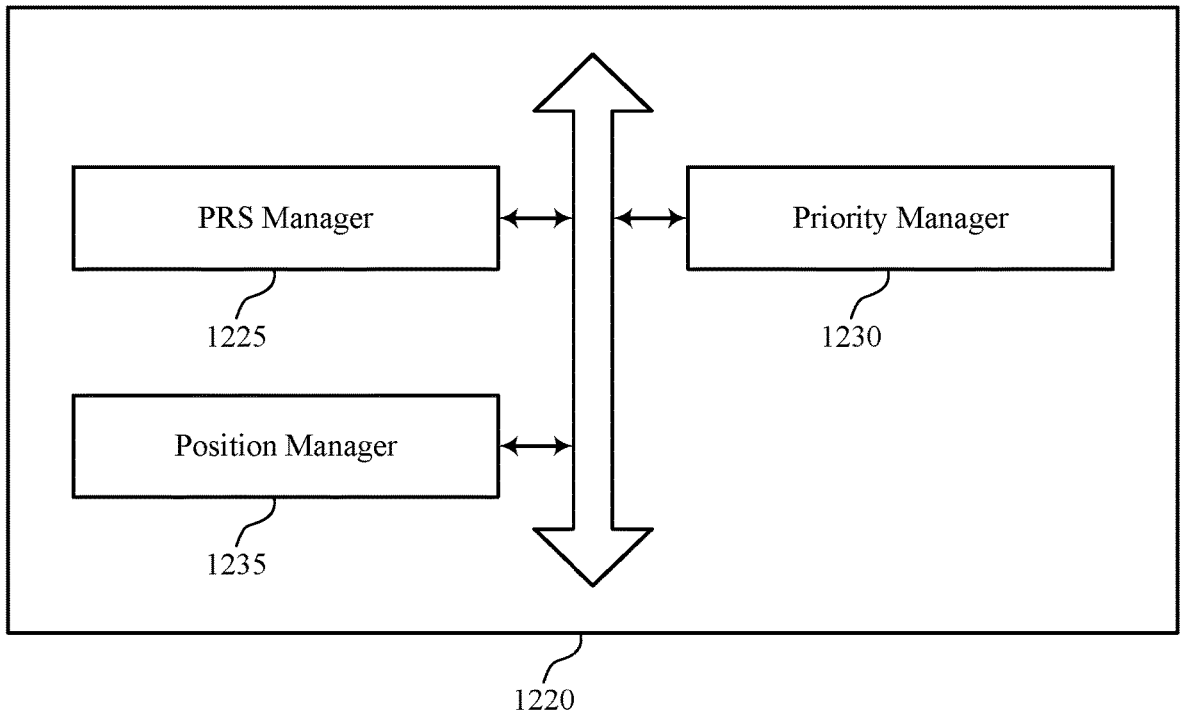
FIG. 12 shows a block diagram of a communications manager that supports processing PRSs according to priority in accordance with one or more aspects of the present disclosure.

FIG. 12 shows a block diagram 1200 of a communications manager 1220 that supports processing PRSs according to priority in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of processing PRSs according to priority as described herein. For example, the communications manager 1220 may include an PRS manager 1225, a priority manager 1230, a position manager 1235, or any combination thereof. Each of these components may communicate, directly or indirectly, with one another (e.g., via one or more buses).

The communications manager 1220 may support wireless communication at an anchor node in accordance with examples as disclosed herein. The PRS manager 1225 may be configured as or otherwise support a means for transmitting, to a UE, a set of PRSs over a set of resources. The priority manager 1230 may be configured as or otherwise support a means for transmitting, to the UE, one or more indications that indicate a respective priority for each of one or more PRSs of the set of PRSs.

In some examples, the PRS manager 1225 may be configured as or otherwise support a means for transmitting the set of PRSs, the set of PRSs scrambled according to a respective scrambling sequence for each of the one or more PRSs, where the respective scrambling sequence indicates the respective priority.

In some examples, the PRS manager 1225 may be configured as or otherwise support a means for transmitting the set of PRSs according to respective resource mapping patterns, where the respective resource mapping patterns for the one or more PRSs indicate the respective priority for each of the one or more PRSs.

In some examples, the priority manager 1230 may be configured as or otherwise support a means for transmitting one or more control channels associated with the one or more PRSs, where the one or more control channels indicate the respective priority for each of the one or more PRSs.

In some examples, a control channel of the one or more control channels includes sidelink control information having a priority field that indicates a priority of a PRS associated with the control channel.

In some examples, the priority manager 1230 may be configured as or otherwise support a means for transmitting at least one control channel including a list associated with the one or more PRSs, the list ordered according to the respective priorities.

In some examples, the priority manager 1230 may be configured as or otherwise support a means for transmitting, to the UE, one or more broadcast signals indicating the respective priorities for the one or more PRSs, where a payload or a sequence of the one or more broadcast signals indicates the respective priorities.

In some examples, the priority manager 1230 may be configured as or otherwise support a means for transmitting a configuration message including a list of priorities, where the respective priorities for the one or more PRSs are based on the list of priorities.

In some examples, the priority manager 1230 may be configured as or otherwise support a means for transmitting one or more priority parameters that indicate the respective priority for each of the one or more PRSs, the respective priorities based on the set of resources, a resource of the set of resources, the anchor node, a reliability of a PRS of the one or more PRSs, or a combination thereof.

In some examples, the priority manager 1230 may be configured as or otherwise support a means for receiving a report including a priority of at least one PRS of the set of PRSs, where the priority of the at least one PRS is based on one or more parameters associated with the anchor node.

In some examples, the priority manager 1230 may be configured as or otherwise support a means for receiving a request for a priority of at least one PRS of the set of PRSs.

In some examples, the position manager 1235 may be configured as or otherwise support a means for detecting a change in position at the anchor node.

In some examples, the respective priorities are based on a type of the anchor node, positioning reliability information associated with the anchor node, transmission parameters associated with the anchor node, a signal quality parameter associated with the anchor node, a mobility parameter of the anchor node, a type of a PRS, a band type for the PRS, or a combination thereof.

In some examples, the anchor node is a sidelink device.

Figure 13:
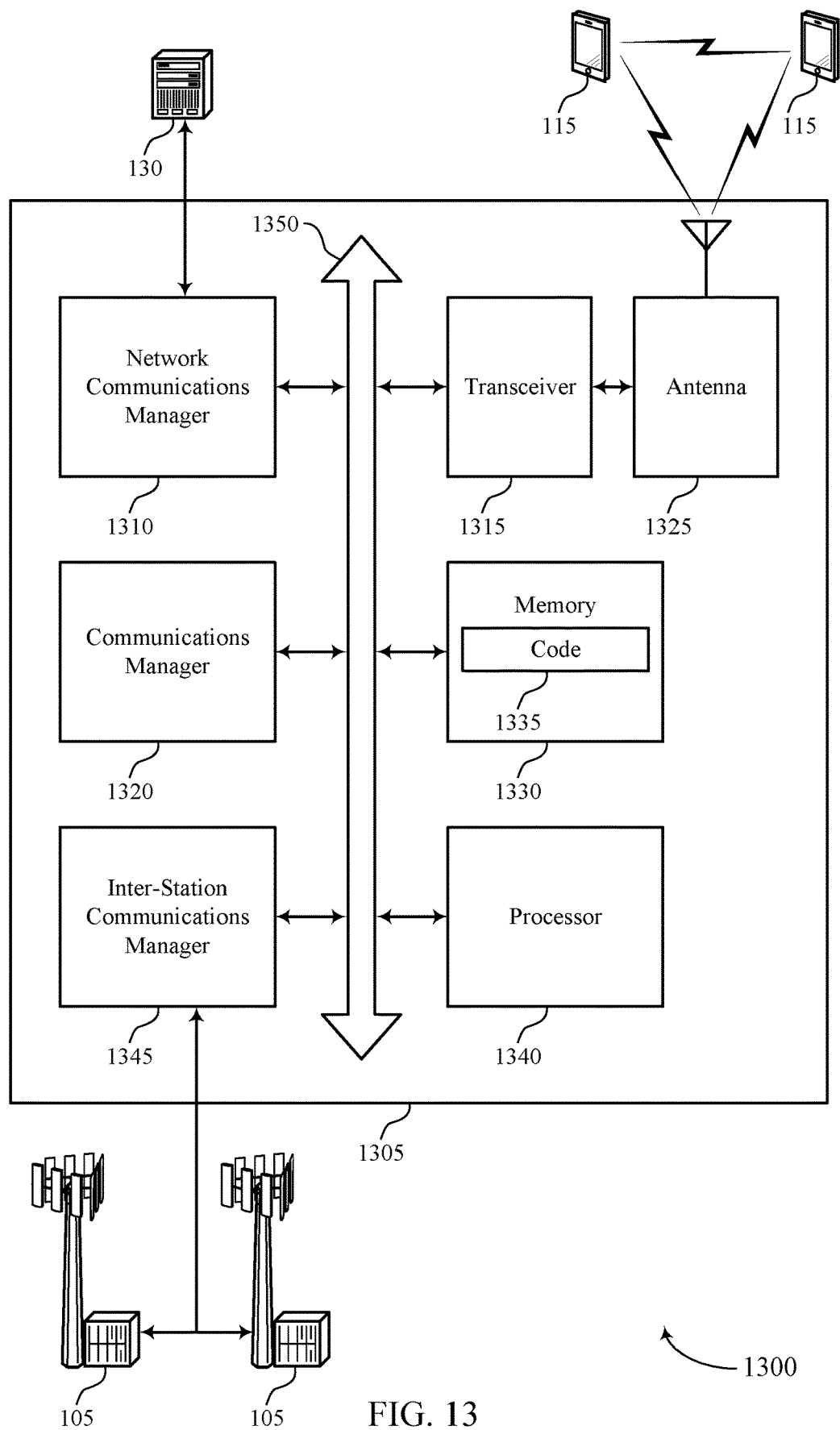
FIG. 13 shows a diagram of a system including a device that supports processing PRSs according to priority in accordance with one or more aspects of the present disclosure.

FIG. 13 shows a diagram of a system 1300 including a device 1305 that supports processing PRSs according to priority in accordance with one or more aspects of the present disclosure. The device 1305 may be an example of or include the components of a device 1005, a device 1105, or an anchor node as described herein. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 915, a transmitter 1015, a receiver 910, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting processing PRSs according to priority). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at an anchor node in accordance with examples as disclosed herein. For example, the communications manager 1320 may be configured as or otherwise support a means for transmitting, to a UE, a set of PRSs over a set of resources. The communications manager 1320 may be configured as or otherwise support a means for transmitting, to the UE, one or more indications that indicate a respective priority for each of one or more PRSs of the set of PRSs.

By including or configuring the communications manager 1320 in accordance with examples as described herein, the device 1305 may support techniques for a UE to process PRSs according to priority, which may cause improved communication reliability, reduced latency, improved user experience related to reduced processing, reduced power consumption, more efficient utilization of communication resources, improved coordination between devices, longer battery life, improved utilization of processing capability, and the like.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of processing PRSs according to priority as described herein, or the processor 1340 and the memory 1330 may be otherwise configured to perform or support such operations.

Figure 14:
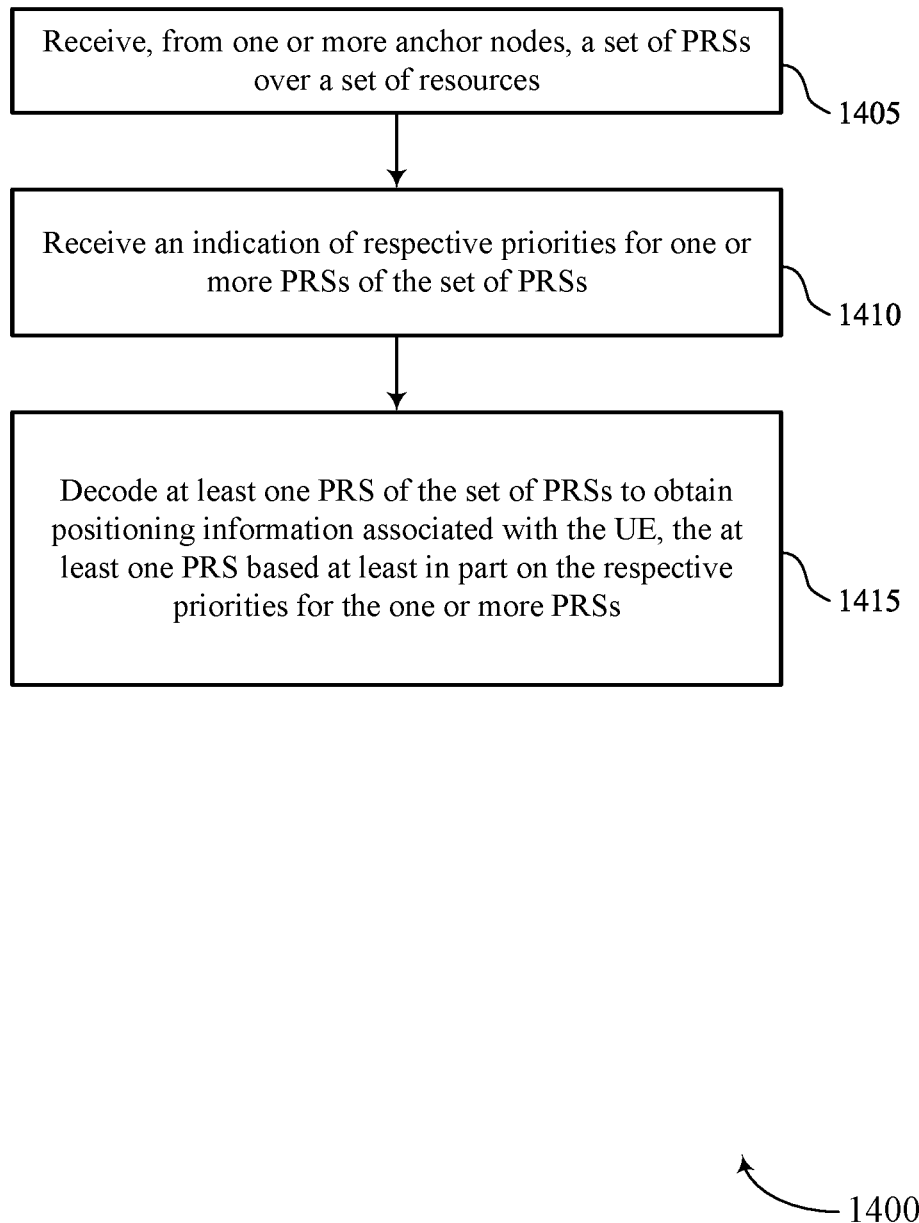
FIGS. 14 through 17 show flowcharts illustrating methods that support processing PRSs according to priority in accordance with one or more aspects of the present disclosure.

FIG. 14 shows a flowchart illustrating a method 1400 that supports processing PRSs according to priority in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from one or more anchor nodes, a set of PRSs over a set of resources. The operations of 1405 may be performed in accordance with examples as disclosed herein. In some examples, aspects of the operations of 1405 may be performed by an PRS component 825 as described with reference to FIG. 8.

At 1410, the method may include receiving one or more indications that indicate a respective priority for each of one or more PRSs of the set of PRSs. The operations of 1410 may be performed in accordance with examples as disclosed herein. In some examples, aspects of the operations of 1410 may be performed by a priority component 830 as described with reference to FIG. 8.

At 1415, the method may include decoding at least one PRS of the set of PRSs to obtain positioning information associated with the UE, the at least one PRS based on the respective priorities for the one or more PRSs. The operations of 1415 may be performed in accordance with examples as disclosed herein. In some examples, aspects of the operations of 1415 may be performed by a positioning component 835 as described with reference to FIG. 8.

Figure 15:
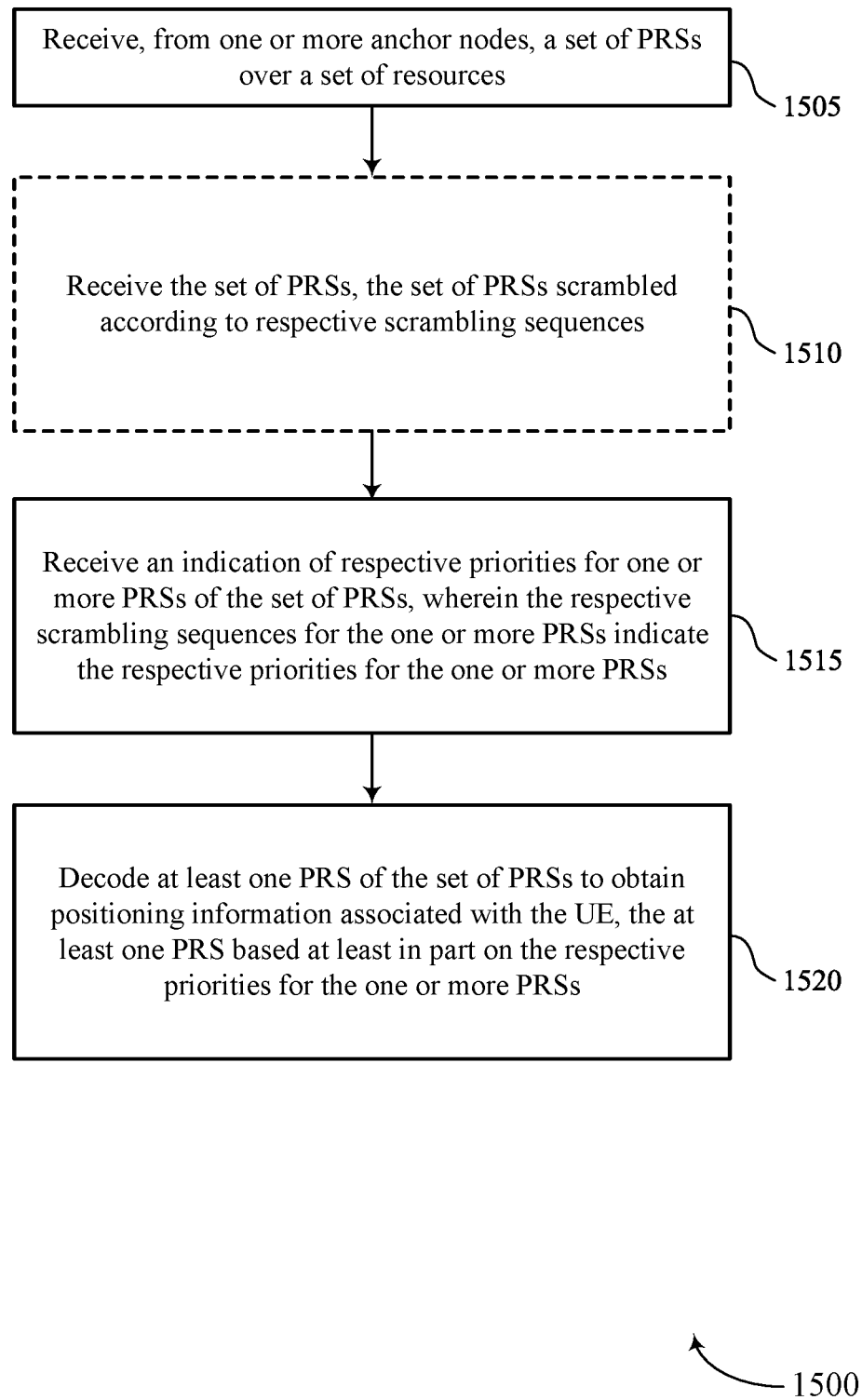

FIG. 15 shows a flowchart illustrating a method 1500 that supports processing PRSs according to priority in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from one or more anchor nodes, a set of PRSs over a set of resources. The operations of 1505 may be performed in accordance with examples as disclosed herein. In some examples, aspects of the operations of 1505 may be performed by an PRS component 825 as described with reference to FIG. 8.

At 1510, the method may include receiving the set of PRSs, the set of PRSs scrambled according to respective scrambling sequences. The operations of 1510 may be performed in accordance with examples as disclosed herein. In some examples, aspects of the operations of 1510 may be performed by an PRS component 825 as described with reference to FIG. 8.

At 1515, the method may include receiving one or more indications that indicate a respective priority for each of one or more PRSs of the set of PRSs, where the respective scrambling sequences for the one or more PRSs indicate the respective priority for each of the one or more PRSs. The operations of 1515 may be performed in accordance with examples as disclosed herein. In some examples, aspects of the operations of 1515 may be performed by a priority component 830 as described with reference to FIG. 8.

At 1520, the method may include decoding at least one PRS of the set of PRSs to obtain positioning information associated with the UE, the at least one PRS based on the respective priorities for the one or more PRSs. The operations of 1520 may be performed in accordance with examples as disclosed herein. In some examples, aspects of the operations of 1520 may be performed by a positioning component 835 as described with reference to FIG. 8.

Figure 16:
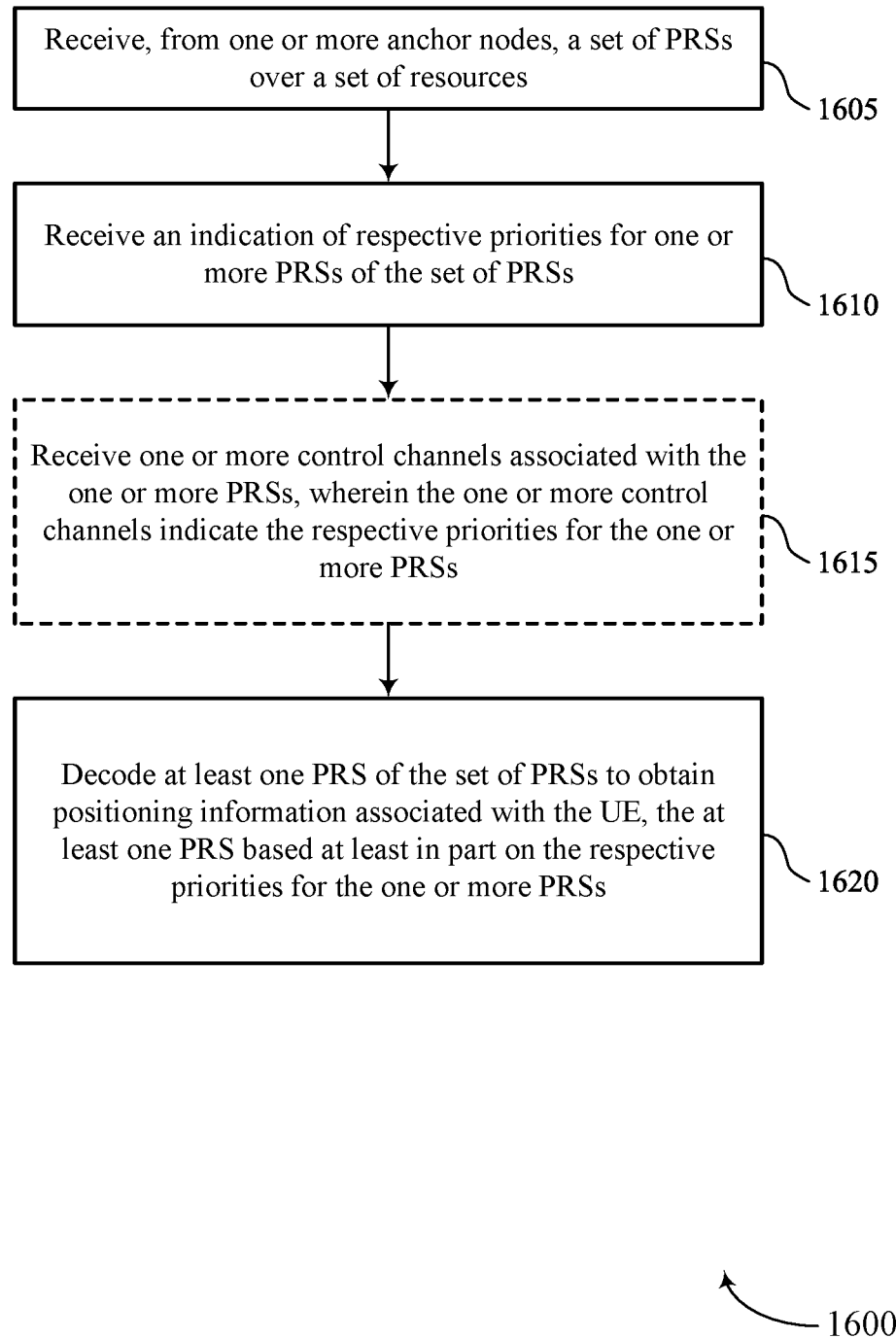

FIG. 16 shows a flowchart illustrating a method 1600 that supports processing PRSs according to priority in accordance with one or more aspects of the present disclosure. The operations of the method 1600 may be implemented by a UE or its components as described herein. For example, the operations of the method 1600 may be performed by a UE 116 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from one or more anchor nodes, a set of PRSs over a set of resources. The operations of 1605 may be performed in accordance with examples as disclosed herein. In some examples, aspects of the operations of 1605 may be performed by an PRS component 825 as described with reference to FIG. 8.

At 1610, the method may include receiving one or more indications that indicate a respective priority for each of one or more PRSs of the set of PRSs. The operations of 1610 may be performed in accordance with examples as disclosed herein. In some examples, aspects of the operations of 1610 may be performed by a priority component 830 as described with reference to FIG. 8.

At 1616, the method may include receiving one or more control channels associated with the one or more PRSs, where the one or more control channels indicate the respective priority for each of the one or more PRSs. The operations of 1616 may be performed in accordance with examples as disclosed herein. In some examples, aspects of the operations of 1616 may be performed by a priority component 830 as described with reference to FIG. 8.

At 1620, the method may include decoding at least one PRS of the set of PRSs to obtain positioning information associated with the UE, the at least one PRS based on the respective priorities for the one or more PRSs. The operations of 1620 may be performed in accordance with examples as disclosed herein. In some examples, aspects of the operations of 1620 may be performed by a positioning component 835 as described with reference to FIG. 8.

Figure 17:
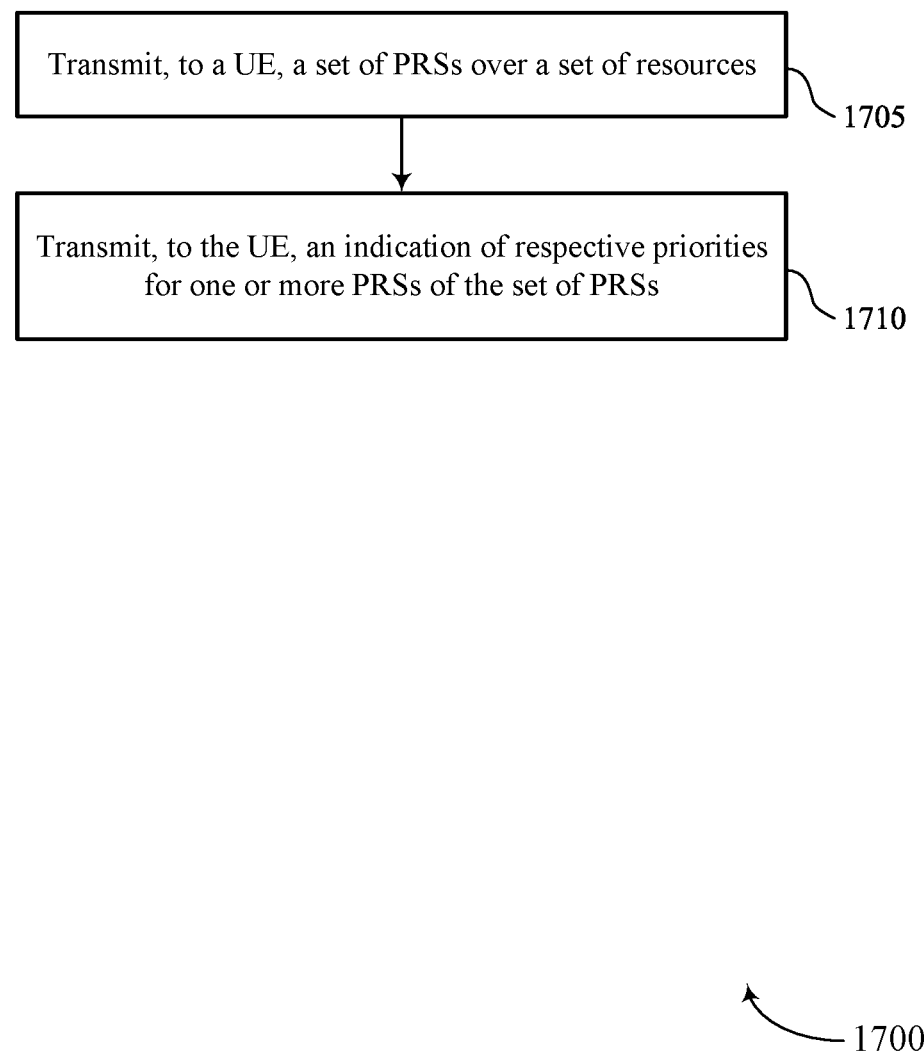

FIG. 17 shows a flowchart illustrating a method 1700 that supports processing PRSs according to priority in accordance with one or more aspects of the present disclosure. The operations of the method 1700 may be implemented by an anchor node or its components as described herein. For example, the operations of the method 1700 may be performed by an anchor node as described with reference to FIGS. 1 through 4 and 10 through 13. In some examples, an anchor node may execute a set of instructions to control the functional elements of the anchor node to perform the described functions. Additionally or alternatively, the anchor node may perform aspects of the described functions using special-purpose hardware.

At 1705, the method may include transmitting, to a UE, a set of PRSs over a set of resources. The operations of 1705 may be performed in accordance with examples as disclosed herein. In some examples, aspects of the operations of 1705 may be performed by an PRS manager 1225 as described with reference to FIG. 12.

At 1710, the method may include transmitting, to the UE, one or more indications that indicate a respective priority for each of one or more PRSs of the set of PRSs. The operations of 1710 may be performed in accordance with examples as disclosed herein. In some examples, aspects of the operations of 1710 may be performed by a priority manager 1230 as described with reference to FIG. 12.

The following provides an overview of aspects of the present disclosure:

Aspect 1: A method for wireless communication at a UE, comprising: receiving, from one or more anchor nodes, a set of positioning reference signals over a set of resources; receiving one or more indications that indicate a respective priority for each of one or more positioning reference signals of the set of positioning reference signals; and decoding at least one positioning reference signal of the set of positioning reference signals to obtain positioning information associated with the UE, the at least one positioning reference signal based at least in part on the indication of the respective priority.

Aspect 2: The method of aspect 1, the receiving the set of positioning reference signals comprising: receiving the set of positioning reference signals, the set of positioning reference signals scrambled according to a respective scrambling sequence for each of the one or more positioning reference signals, wherein the respective scrambling sequence indicates the respective priority.

Aspect 3: The method of any of aspects 1 through 2, the receiving the set of positioning reference signals comprising: receiving the set of positioning reference signals, the set of positioning reference signals received according to a respective resource mapping pattern for each of the one or more positioning reference signals, wherein the respective resource mapping pattern indicates the respective priority.

Aspect 4: The method of aspect 1, the receiving the indication comprising: receiving one or more control channels associated with the one or more positioning reference signals, wherein the one or more control channels indicate the respective priority for each of the one or more positioning reference signals.

Aspect 5: The method of aspect 4, wherein a control channel of the one or more control channels comprises sidelink control information having a priority field that indicates a priority of a positioning reference signal associated with the control channel.

Aspect 6: The method of any of aspects 1 through 5, the receiving the indication comprising: receiving at least one control channel comprising a list associated with the one or more positioning reference signals, the list ordered according to the respective priority for each of the one or more positioning reference signals.

Aspect 7: The method of any of aspects 1 through 6, the receiving the indication comprising: receiving, from the one or more anchor nodes, one or more broadcast signals indicating the respective priority for each of the one or more positioning reference signals, wherein a payload or a sequence of the one or more broadcast signals indicates the respective priority.

Aspect 8: The method of any of aspects 1 through 7, the receiving the indication comprising: receiving a configuration message comprising a list of priorities, wherein the respective priority for each of the one or more positioning reference signals are based at least in part on the list of priorities.

Aspect 9: The method of any of aspects 1 through 8, the receiving the indication comprising: receiving one or more priority parameters that indicate the respective priority for each of the one or more positioning reference signals, the respective priority based at least in part on the set of resources, a resource of the set of resources, an anchor node of the one or more anchor nodes, a reliability of a positioning reference signal of the one or more positioning reference signals, or a combination thereof.

Aspect 10: The method of any of aspects 1 through 9, further comprising: selecting the at least one positioning reference signal from the one or more positioning reference signals based at least in part on a priority rule for obtaining the positioning information associated with the UE and the one or more indications.

Aspect 11: The method of any of aspects 1 through 10, further comprising: selecting the at least one positioning reference signal from the one or more positioning reference signals based at least in part on a capability of the UE.

Aspect 12: The method of any of aspects 1 through 11, further comprising: selecting the at least one positioning reference signal based at least in part on a priority of the at least one positioning reference signal being greater than a priority of a second positioning reference signal of the one or more positioning reference signals, wherein one or more resources of the at least one positioning reference signal overlap with one or more resources of the second positioning reference signal.

Aspect 13: The method of any of aspects 1 through 12, further comprising: transmitting a report comprising a priority of the at least one positioning reference signal, wherein the priority is based at least in part on one or more parameters associated with the UE.

Aspect 14: The method of any of aspects 1 through 13, further comprising: transmitting a request for a priority of the at least one positioning reference signal.

Aspect 15: The method of any of aspects 1 through 14, further comprising: determining to override the respective priority for the at least one positioning reference signal based at least in part on one or more parameters of the UE; and selecting the at least one positioning reference signal based at least in part on determining to override the respective priority for the at least one positioning reference signal.

Aspect 16: The method of any of aspects 1 through 15 wherein the respective priority for each of the one or more positioning reference signals are based at least in part on a type of an anchor node of the one or more anchor nodes, positioning reliability information associated with the anchor node, transmission parameters associated with the anchor node, a signal quality parameter associated with the anchor node, a mobility parameter of the anchor node, a type of a positioning reference signal, a band type for the positioning reference signal, or a combination thereof.

Aspect 17: A method for wireless communication at a node, comprising: transmitting, to a UE, a set of positioning reference signals over a set of resources; and transmitting, to the UE, one or more indications that indicate a respective priority for each of one or more positioning reference signals of the set of positioning reference signals.

Aspect 18: The method of aspect 17, the transmitting the set of positioning reference signals comprising: transmitting the set of positioning reference signals, the set of positioning reference signals scrambled according to a respective scrambling sequence for each of the one or more positioning reference signals, wherein the respective scrambling sequence indicates the respective priority.

Aspect 19: The method of any of aspects 17 through 18, the transmitting the set of positioning reference signals comprising: transmitting the set of positioning reference signals according to a respective resource mapping pattern, wherein the respective resource mapping pattern indicates the respective priority.

Aspect 20: The method of aspect 17, the transmitting the indication comprising: transmitting one or more control channels associated with the one or more positioning reference signals, wherein the one or more control channels indicate the respective priority for each of the one or more positioning reference signals.

Aspect 21: The method of aspect 20, wherein a control channel of the one or more control channels comprises sidelink control information having a priority field that indicates a priority of a positioning reference signal associated with the control channel.

Aspect 22: The method of any of aspects 17 through 21, the transmitting the indication comprising: transmitting at least one control channel comprising a list associated with the one or more positioning reference signals, the list ordered according to the respective priority for each of the one or more positioning reference signals.

Aspect 23: The method of any of aspects 17 through 22, the transmitting the indication comprising: transmitting, to the UE, one or more broadcast signals indicating the respective priority for each of the one or more positioning reference signals, wherein a payload or a sequence of the one or more broadcast signals indicates the respective priority.

Aspect 24: The method of any of aspects 17 through 23, the transmitting the indication comprising: transmitting a configuration message comprising a list of priorities, wherein the respective priority for each of the one or more positioning reference signals are based at least in part on the list of priorities.

Aspect 25: The method of any of aspects 17 through 24, the transmitting the indication comprising: transmitting one or more priority parameters that indicate the respective priority for each of the one or more positioning reference signals, the respective priority based at least in part on the set of resources, a resource of the set of resources, the node, a reliability of a positioning reference signal of the one or more positioning reference signals, or a combination thereof.

Aspect 26: The method of any of aspects 17 through 25, further comprising: receiving a report comprising a priority of at least one positioning reference signal of the set of positioning reference signals, wherein the priority of the at least one positioning reference signal is based at least in part on one or more parameters associated with the node.

Aspect 27: The method of any of aspects 17 through 26, further comprising: receiving a request for a priority of at least one positioning reference signal of the set of positioning reference signals.

Aspect 28: The method of any of aspects 17 through 27, the transmitting the indication of respective priorities comprising: detecting a change in position at the node.

Aspect 29: The method of any of aspects 17 through 28 wherein the respective priorities are based at least in part on a type of the node, positioning reliability information associated with the node, transmission parameters associated with the node, a signal quality parameter associated with the anchor node, a mobility parameter of the node, a type of a positioning reference signal, a band type for the positioning reference signal, or a combination thereof.

Aspect 30: The method of any of aspects 17 through 29 wherein the node is a sidelink device.

Aspect 31: An apparatus for wireless communication at a UE, comprising a processor; and memory coupled to the processor, the processor and memory configured to perform a method of any of aspects 1 through 16.

Aspect 32: An apparatus for wireless communication at a UE, comprising at least one means for performing a method of any of aspects 1 through 16.

Aspect 33: A non-transitory computer-readable medium storing code for wireless communication at a UE, the code comprising instructions executable by a processor to perform a method of any of aspects 1 through 16.

Aspect 34: An apparatus for wireless communication at an anchor node, comprising a processor; and memory coupled to the processor, the processor and memory configured to perform a method of any of aspects 17 through 30.

Aspect 35: An apparatus for wireless communication at a node, comprising at least one means for performing a method of any of aspects 17 through 30.

Aspect 36: A non-transitory computer-readable medium storing code for wireless communication at a node, the code comprising instructions executable by a processor to perform a method of any of aspects 17 through 30.

Aspect 37: A method for wireless communication at a UE, comprising: receiving, from one or more anchor nodes, a set of positioning reference signals over a set of resources; receiving an indication of respective priorities for one or more positioning reference signals of the set of positioning reference signals; and decoding at least one positioning reference signal of the set of positioning reference signals to obtain positioning information associated with the UE, the at least one positioning reference signal based at least in part on the respective priorities for the one or more positioning reference signals.

Aspect 38: The method of aspect 37, the receiving the set of positioning reference signals comprising: receiving the set of positioning reference signals, the set of positioning reference signals scrambled according to respective scrambling sequences, wherein the respective scrambling sequences for the one or more positioning reference signals indicate the respective priorities for the one or more positioning reference signals.

Aspect 39: The method of any of aspects 37 through 38, the receiving the set of positioning reference signals comprising: receiving the set of positioning reference signals, the set of positioning reference signals received according to a resource mapping pattern, wherein the respective resource mapping patterns for the one or more positioning reference signals indicate the respective priorities for the one or more positioning reference signals.

Aspect 40: The method of any of aspects 37 through 39, the receiving the indication comprising: receiving one or more control channels associated with the one or more positioning reference signals, wherein the one or more control channels indicate the respective priorities for the one or more positioning reference signals.

Aspect 41: The method of aspect 40, wherein a control channel of the one or more control channels comprises sidelink control information having a priority field that indicates a priority of a positioning reference signal associated with the control channel.

Aspect 42: The method of any of aspects 37 through 41, the receiving the indication comprising: receiving at least one control channel comprising a list associated with the one or more positioning reference signals, the list ordered according to the respective priorities.

Aspect 43: The method of any of aspects 37 through 42, the receiving the indication comprising: receiving, from the one or more anchor nodes, one or more broadcast signals indicating the respective priorities for the one or more positioning reference signals, wherein a payload or a sequence of the one or more broadcast signals indicates the respective priorities.

Aspect 44: The method of any of aspects 37 through 43, the receiving the indication comprising: receiving a configuration message comprising a list of priorities, wherein the respective priorities for the one or more positioning reference signals are based at least in part on the list of priorities.

Aspect 45: The method of any of aspects 37 through 44, the receiving the indication comprising: receiving one or more priority parameters that indicate the respective priorities for the one or more positioning reference signals, the respective priorities based at least in part on the set of resources, a resource of the set of resources, an anchor node of the one or more anchor nodes, a reliability of a positioning reference signal of the one or more positioning reference signals, or a combination thereof.

Aspect 46: The method of any of aspects 37 through 45, further comprising: selecting the at least one positioning reference signal from the one or more positioning reference signals based at least in part on a priority rule for obtaining the positioning information associated with the UE and the indication of the respective priorities for the one or more positioning reference signals.

Aspect 47: The method of any of aspects 37 through 46, further comprising: selecting the at least one positioning reference signal from the one or more positioning reference signals based at least in part on a capability of the UE.

Aspect 48: The method of any of aspects 37 through 47, further comprising: selecting the at least one positioning reference signal based at least in part on a priority of the at least one positioning reference signal being greater than a priority of a second positioning reference signal of the one or more positioning reference signals, wherein one or more resources of the at least one positioning reference signal overlap with one or more resources of the second positioning reference signal.

Aspect 49: The method of any of aspects 37 through 48, further comprising: transmitting a report comprising a priority of the at least one positioning reference signal, wherein the priority is based at least in part on one or more parameters associated with the UE.

Aspect 50: The method of any of aspects 37 through 49, further comprising: transmitting a request for a priority of the at least one positioning reference signal.

Aspect 51: The method of any of aspects 37 through 50, further comprising: determining to override the respective priority for the at least one positioning reference signal based at least in part on one or more parameters of the UE; and selecting the at least one positioning reference signal based at least in part on determining to override the respective priority for the at least one positioning reference signal.

Aspect 52: The method of any of aspects 37 through 51 wherein the respective priorities are based at least in part on a type of an anchor node of the one or more anchor nodes, positioning reliability information associated with the anchor node, transmission parameters associated with the anchor node, a signal quality parameter associated with the anchor node, a mobility parameter of the anchor node, a type of a positioning reference signal, a band type for the positioning reference signal, or a combination thereof.

Aspect 53: A method for wireless communication at an anchor node, comprising: transmitting, to a UE, a set of positioning reference signals over a set of resources; and transmitting, to the UE, an indication of respective priorities for one or more positioning reference signals of the set of positioning reference signals.

Aspect 54: The method of aspect 53, the transmitting the set of positioning reference signals comprising: transmitting the set of positioning reference signals, the set of positioning reference signals scrambled according to respective scrambling sequences, wherein the respective scrambling sequences for the one or more positioning reference signals indicate the respective priorities for the one or more positioning reference signals.

Aspect 55: The method of any of aspects 53 through 54, the transmitting the set of positioning reference signals comprising: transmitting the set of positioning reference signals, the set of positioning reference signals transmitted according to a resource mapping pattern, wherein the respective resource mapping patterns for the one or more positioning reference signals indicate the respective priorities for the one or more positioning reference signals.

Aspect 56: The method of any of aspects 53 through 55, the transmitting the indication comprising: transmitting one or more control channels associated with the one or more positioning reference signals, wherein the one or more control channels indicate the respective priorities for the one or more positioning reference signals.

Aspect 57: The method of aspect 56, wherein a control channel of the one or more control channels comprises sidelink control information having a priority field that indicates a priority of a positioning reference signal associated with the control channel.

Aspect 58: The method of any of aspects 53 through 57, the transmitting the indication comprising: transmitting at least one control channel comprising a list associated with the one or more positioning reference signals, the list ordered according to the respective priorities.

Aspect 59: The method of any of aspects 53 through 58, the transmitting the indication comprising: transmitting, to the UE, one or more broadcast signals indicating the respective priorities for the one or more positioning reference signals, wherein a payload or a sequence of the one or more broadcast signals indicates the respective priorities.

Aspect 60: The method of any of aspects 53 through 59, the transmitting the indication comprising: transmitting a configuration message comprising a list of priorities, wherein the respective priorities for the one or more positioning reference signals are based at least in part on the list of priorities.

Aspect 61: The method of any of aspects 53 through 60, the transmitting the indication comprising: transmitting one or more priority parameters that indicate the respective priorities for the one or more positioning reference signals, the respective priorities based at least in part on the set of resources, a resource of the set of resources, the anchor node, a reliability of a positioning reference signal of the one or more positioning reference signals, or a combination thereof.

Aspect 62: The method of any of aspects 53 through 61, further comprising: receiving a report comprising a priority of at least one positioning reference signal of the set of positioning reference signals, wherein the priority of the at least one positioning reference signal is based at least in part on one or more parameters associated with the anchor node.

Aspect 63: The method of any of aspects 53 through 62, further comprising: receiving a request for a priority of at least one positioning reference signal of the set of positioning reference signals.

Aspect 64: The method of any of aspects 53 through 63, the transmitting the indication of respective priorities comprising: detecting a change in position at the anchor node.

Aspect 65: The method of any of aspects 53 through 64 wherein the respective priorities are based at least in part on a type of the anchor node, positioning reliability information associated with the anchor node, transmission parameters associated with the anchor node, a signal quality parameter associated with the anchor node, a mobility parameter of the anchor node, a type of a positioning reference signal, a band type for the positioning reference signal, or a combination thereof.

Aspect 66: The method of any of aspects 53 through 65 wherein the anchor node is a sidelink device.

Aspect 67: An apparatus for wireless communication at a UE, comprising a processor; and memory coupled to the processor, the processor and memory configured to perform a method of any of aspects 37 through 52.

Aspect 68: An apparatus for wireless communication at a UE, comprising at least one means for performing a method of any of aspects 37 through 52.

Aspect 69: A non-transitory computer-readable medium storing code for wireless communication at a UE, the code comprising instructions executable by a processor to perform a method of any of aspects 37 through 52.

Aspect 70: An apparatus for wireless communication at an anchor node, comprising a processor; and memory coupled to the processor, the processor and memory configured to perform a method of any of aspects 53 through 66.

Aspect 71: An apparatus for wireless communication at an anchor node, comprising at least one means for performing a method of any of aspects 53 through 66.

Aspect 72: A non-transitory computer-readable medium storing code for wireless communication at an anchor node, the code comprising instructions executable by a processor to perform a method of any of aspects 53 through 66.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
     receive, from one or more anchor nodes, a set of sidelink positioning reference signals over a set of resources;
     obtain, based at least in part on one or more scrambling sequences, one or more indications that indicate a respective priority for each of one or more sidelink positioning reference signals of the set of sidelink positioning reference signals; and
     decode at least one sidelink positioning reference signal of the set of sidelink positioning reference signals to obtain positioning information associated with the UE, the at least one sidelink positioning reference signal based at least in part on the one or more indications.

2. The apparatus of claim 1, wherein the one or more processors are configured to cause the UE to:
   receive the set of sidelink positioning reference signals, the set of sidelink positioning reference signals scrambled according to a respective scrambling sequence of the one or more scrambling sequences for each of the one or more sidelink positioning reference signals, wherein the respective scrambling sequence indicates the respective priority.

3. The apparatus of claim 1, wherein the one or more processors are configured to cause the UE to:
   receive the set of sidelink positioning reference signals according to a respective resource mapping pattern for each of the one or more sidelink positioning reference signals, wherein the respective resource mapping pattern indicates the respective priority.

4. The apparatus of claim 1, wherein the one or more processors are configured to cause the UE to:
   receive one or more control channels associated with the one or more sidelink positioning reference signals, wherein the one or more control channels indicate the respective priority for each of the one or more sidelink positioning reference signals.

5. The apparatus of claim 4, wherein a control channel of the one or more control channels comprises sidelink control information having a priority field that indicates a priority of a sidelink positioning reference signal associated with the control channel.

6. The apparatus of claim 1, wherein the one or more processors are configured to cause the UE to:
receive at least one control channel comprising a list associated with the one or more sidelink positioning reference signals, the list ordered according to the respective priority for each of the one or more sidelink positioning reference signals.

7. The apparatus of claim 1, wherein the one or more processors are configured to cause the UE to:
receive, from the one or more anchor nodes, one or more broadcast signals indicating the respective priority for each of the one or more sidelink positioning reference signals, wherein a payload or a sequence of the one or more broadcast signals indicates the respective priority.

8. The apparatus of claim 1, wherein the one or more processors are configured to cause the UE to:
receive a configuration message comprising a list of priorities, wherein the respective priority for each of the one or more sidelink positioning reference signals are based at least in part on the list of priorities.

9. The apparatus of claim 1, wherein the one or more processors are configured to cause the UE to:
receive one or more priority parameters that indicate the respective priority for each of the one or more sidelink positioning reference signals, the respective priority based at least in part on the set of resources, a resource of the set of resources, an anchor node of the one or more anchor nodes, a reliability of a sidelink positioning reference signal of the one or more sidelink positioning reference signals, or a combination thereof.

10. The apparatus of claim 1, wherein the one or more processors are configured to cause the UE to:
select the at least one sidelink positioning reference signal from the one or more sidelink positioning reference signals based at least in part on a priority rule for obtaining the positioning information associated with the UE and the one or more indications.

11. The apparatus of claim 1, wherein the one or more processors are configured to cause the UE to:
select the at least one sidelink positioning reference signal from the one or more sidelink positioning reference signals based at least in part on a capability of the UE.

12. The apparatus of claim 1, wherein the one or more processors are configured to cause the UE to:
select the at least one sidelink positioning reference signal based at least in part on a priority of the at least one sidelink positioning reference signal being greater than a priority of a second sidelink positioning reference signal of the one or more sidelink positioning reference signals, wherein one or more resources of the at least one sidelink positioning reference signal overlap with one or more resources of the second sidelink positioning reference signal.

13. The apparatus of claim 1, wherein the one or more processors are configured to cause the UE to:
transmit a report comprising a priority of the at least one sidelink positioning reference signal, wherein the priority is based at least in part on one or more parameters associated with the UE.

14. The apparatus of claim 1, wherein the one or more processors are configured to cause the UE to:
transmit a request for a priority of the at least one sidelink positioning reference signal, wherein the one or more indications that indicate the respective priority for each of the one or more sidelink positioning reference signals received are in response to the request.

15. The apparatus of claim 1, wherein the one or more processors are configured to cause the UE to:
determine to override the respective priority for the at least one sidelink positioning reference signal based at least in part on one or more parameters of the UE; and
select the at least one sidelink positioning reference signal based at least in part on determining to override the respective priority for the at least one sidelink positioning reference signal.

16. The apparatus of claim 1, wherein the respective priority for each of the one or more sidelink positioning reference signals are based at least in part on a type of an anchor node of the one or more anchor nodes, positioning reliability information associated with the anchor node, transmission parameters associated with the anchor node, a signal quality parameter associated with the anchor node, a mobility parameter of the anchor node, a type of a sidelink positioning reference signal, a band type for the sidelink positioning reference signal, or a combination thereof.

17. An apparatus for wireless communication at a node, comprising:
one or more memories; and
one or more processors coupled with the one or more memories and configured to cause the node to:
transmit, a set of sidelink positioning reference signals over a set of resources; and
output, based at least in part on one or more scrambling sequences, one or more indications that indicate a respective priority for each of one or more sidelink positioning reference signals of the set of sidelink positioning reference signals.

18. The apparatus of claim 17, wherein, to transmit the set of sidelink positioning reference signals, the one or more processors are configured to cause the node to:
transmit the set of sidelink positioning reference signals, the set of sidelink positioning reference signals scrambled according to a respective scrambling sequence of the one or more scrambling sequences for each of the one or more sidelink positioning reference signals, wherein the respective scrambling sequence indicates the respective priority.

19. The apparatus of claim 17, wherein, to transmit the set of sidelink positioning reference signals, the one or more processors are configured to cause the node to:
transmit the set of sidelink positioning reference signals according to a respective resource mapping pattern for each of the one or more sidelink positioning reference signals, wherein the respective resource mapping pattern indicates the respective priority.

20. The apparatus of claim 17, wherein the one or more processors are configured to cause the node to:
transmit one or more control channels associated with the one or more sidelink positioning reference signals, wherein the one or more control channels indicate the respective priority for each of the one or more sidelink positioning reference signals.

21. The apparatus of claim 17, wherein the one or more processors are configured to cause the node to:
transmit at least one control channel comprising a list associated with the one or more sidelink positioning reference signals, the list ordered according to the respective priority for each of the one or more sidelink positioning reference signals.

22. The apparatus of claim 17, wherein the one or more processors are configured to cause the node to:
transmit one or more broadcast signals indicating the respective priority for each of the one or more sidelink positioning reference signals, wherein a payload or a sequence of the one or more broadcast signals indicates the respective priority.

23. The apparatus of claim 17, wherein the one or more processors are configured to cause the node to:
transmit a configuration message comprising a list of priorities, wherein the respective priority for each of the one or more sidelink positioning reference signals are based at least in part on the list of priorities.

24. The apparatus of claim 17, wherein the one or more processors are configured to cause the node to:
transmit one or more priority parameters that indicate the respective priority for each of the one or more sidelink positioning reference signals, the respective priority based at least in part on the set of resources, a resource of the set of resources, the node, a reliability of a sidelink positioning reference signal of the one or more sidelink positioning reference signals, or a combination thereof.

25. The apparatus of claim 17, wherein the one or more processors are configured to cause the node to:
receive a report comprising a priority of at least one sidelink positioning reference signal of the set of sidelink positioning reference signals, wherein the priority of the at least one sidelink positioning reference signal is based at least in part on one or more parameters associated with the node.

26. The apparatus of claim 17, wherein the one or more processors are configured to cause the node to:
receive a request for a priority of at least one sidelink positioning reference signal of the set of sidelink positioning reference signals, wherein the one or more indications that indicate the respective priority for each of the one or more sidelink positioning reference signals are transmitted in response to the request.

27. The apparatus of claim 17, wherein the one or more processors are configured to cause the node to:
detect a change in position of the node.

28. The apparatus of claim 17, wherein the node is a sidelink device.

29. A method for wireless communication at a user equipment (UE), comprising:
receiving, from one or more anchor nodes, a set of sidelink positioning reference signals over a set of resources;
obtaining, based at least in part on one or more scrambling sequences, one or more indications that indicate a respective priority for each of one or more sidelink positioning reference signals of the set of sidelink positioning reference signals; and
decoding at least one sidelink positioning reference signal of the set of sidelink positioning reference signals to obtain positioning information associated with the UE, the at least one sidelink positioning reference signal based at least in part on the one or more indications.

30. A method for wireless communication at a node, comprising:
transmitting a set of sidelink positioning reference signals over a set of resources; and
outputting, based at least in part on one or more scrambling sequences, one or more indications that indicate a respective priority for each of one or more sidelink positioning reference signals of the set of sidelink positioning reference signals.

31. A non-transitory computer-readable medium storing code for wireless communication at a user equipment (UE), the code comprising instructions executable by one or more processors to cause the UE to:
receive, from one or more anchor nodes, a set of sidelink positioning reference signals over a set of resources;
obtain, based at least in part on one or more scrambling sequences, one or more indications that indicate a respective priority for each of one or more sidelink positioning reference signals of the set of sidelink positioning reference signals; and
decode at least one sidelink positioning reference signal of the set of sidelink positioning reference signals to obtain positioning information associated with the UE, the at least one sidelink positioning reference signal based at least in part on the one or more indications.

32. A non-transitory computer-readable medium storing code for wireless communication at a node, the code comprising instructions executable by one or more processors to cause the node to:
transmit a set of sidelink positioning reference signals over a set of resources; and
transmit one or more indications that indicate a respective priority for each of one or more sidelink positioning reference signals of the set of sidelink positioning reference signals.

33. The method of claim 29, further comprising:
receiving the set of sidelink positioning reference signals, the set of sidelink positioning reference signals scrambled according to a respective scrambling sequence for each of the one or more sidelink positioning reference signals, wherein the respective scrambling sequence indicates the respective priority.

34. The method of claim 29, further comprising:
receiving the set of sidelink positioning reference signals according to a respective resource mapping pattern for each of the one or more sidelink positioning reference signals, wherein the respective resource mapping pattern indicates the respective priority.

35. The method of claim 30, further comprising:
transmitting the set of sidelink positioning reference signals, the set of sidelink positioning reference signals scrambled according to a respective scrambling sequence for each of the one or more sidelink positioning reference signals, wherein the respective scrambling sequence indicates the respective priority.

36. The method of claim 30, further comprising:
transmit the set of sidelink positioning reference signals according to a respective resource mapping pattern for each of the one or more sidelink positioning reference signals, wherein the respective resource mapping pattern indicates the respective priority.

* * * * *